April 7, 1953   R. M. BLOCH   2,634,052
DIAGNOSTIC INFORMATION MONITORING SYSTEM
Filed April 27, 1949   10 Sheets-Sheet 3
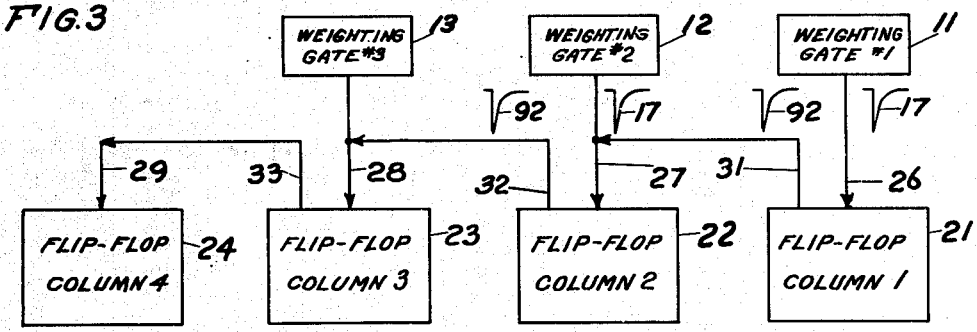
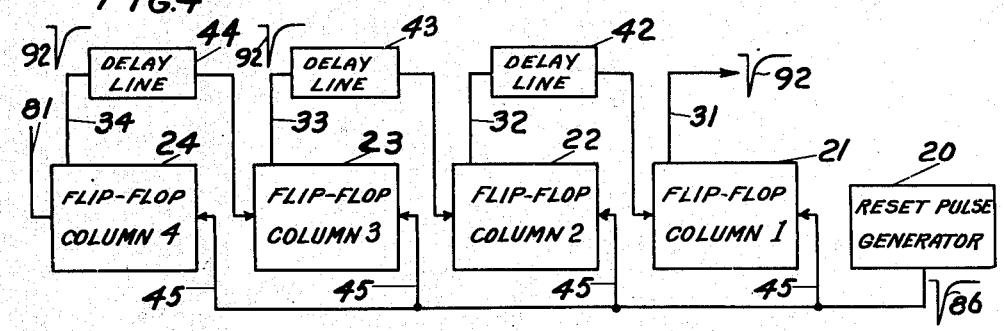
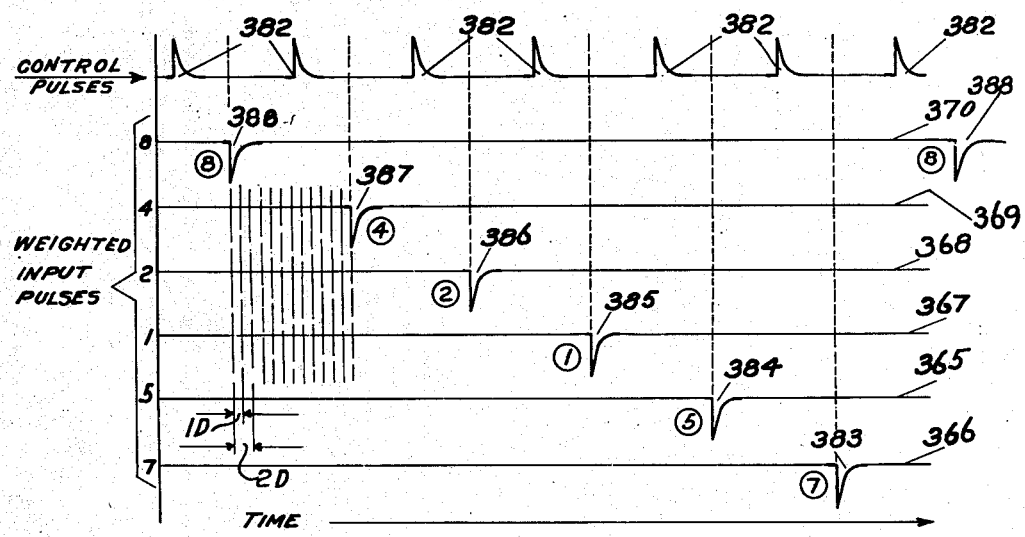
INVENTOR
RICHARD M. BLOCH
By Elmer J. Gorn
ATTORNEY

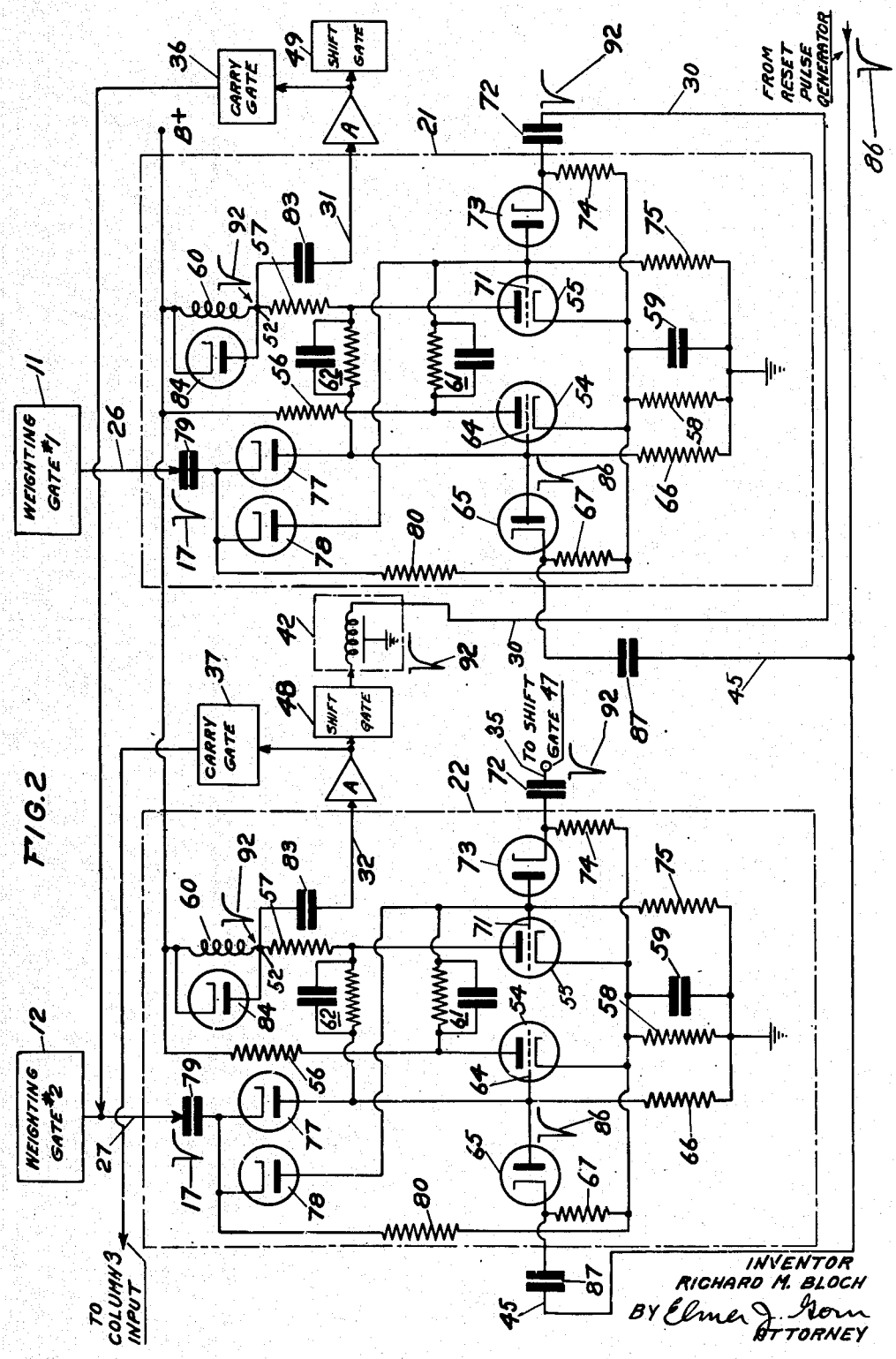

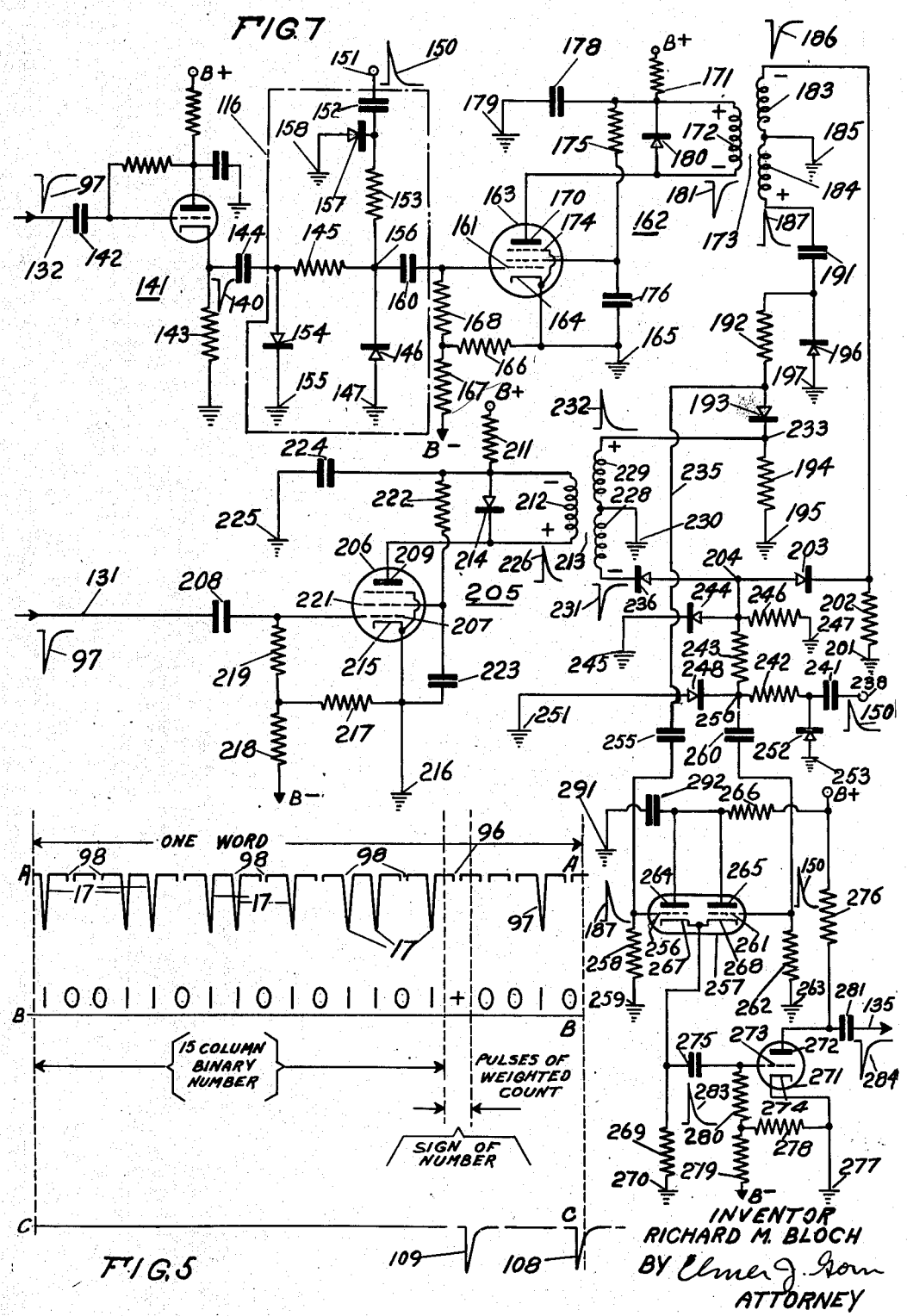

INVENTOR
RICHARD M. BLOCH
BY Elmer J. Horn
ATTORNEY

April 7, 1953          R. M. BLOCH          2,634,052
DIAGNOSTIC INFORMATION MONITORING SYSTEM
Filed April 27, 1949          10 Sheets-Sheet 6
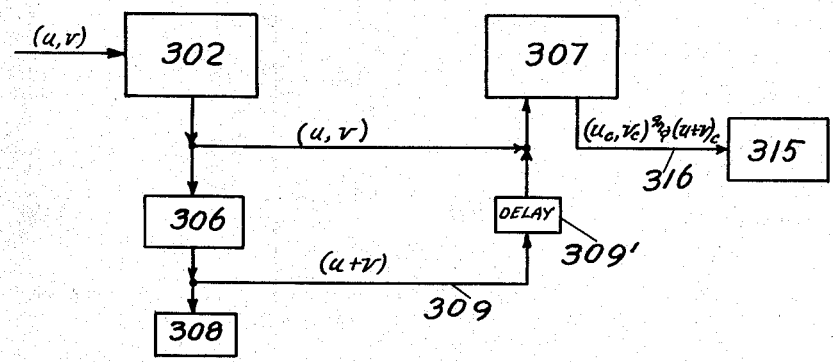
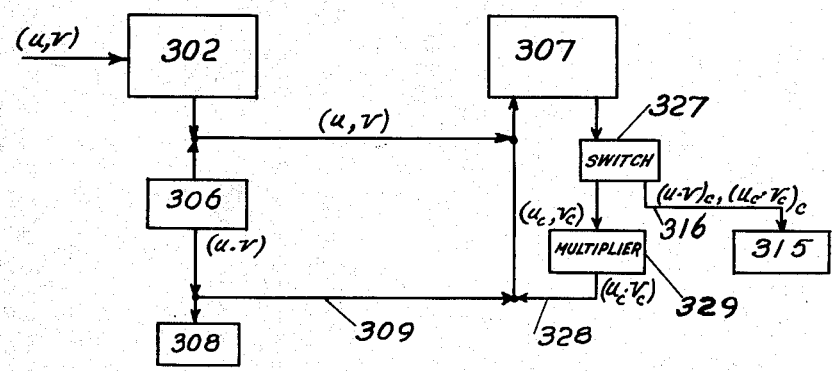
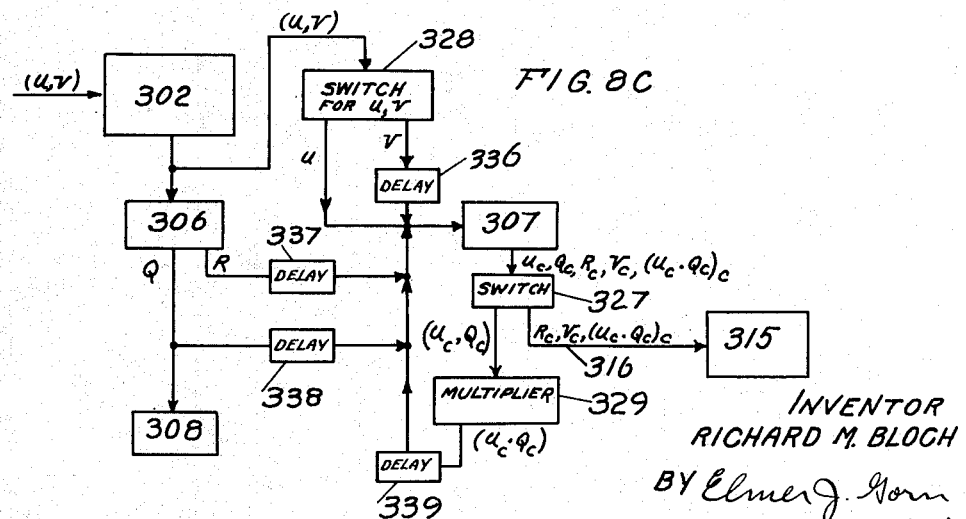
INVENTOR
RICHARD M. BLOCH
BY Elmer J. Gorn
ATTORNEY

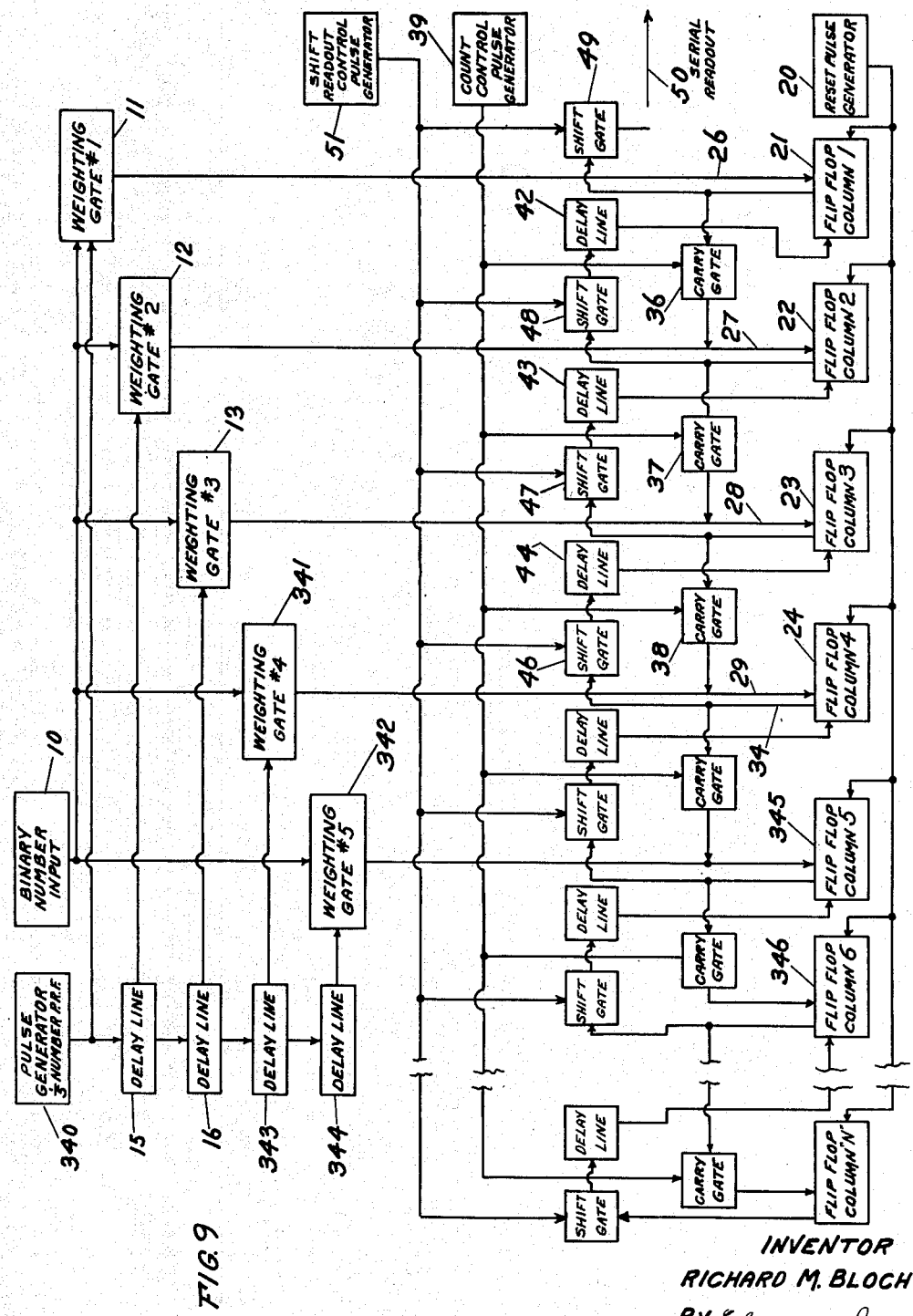

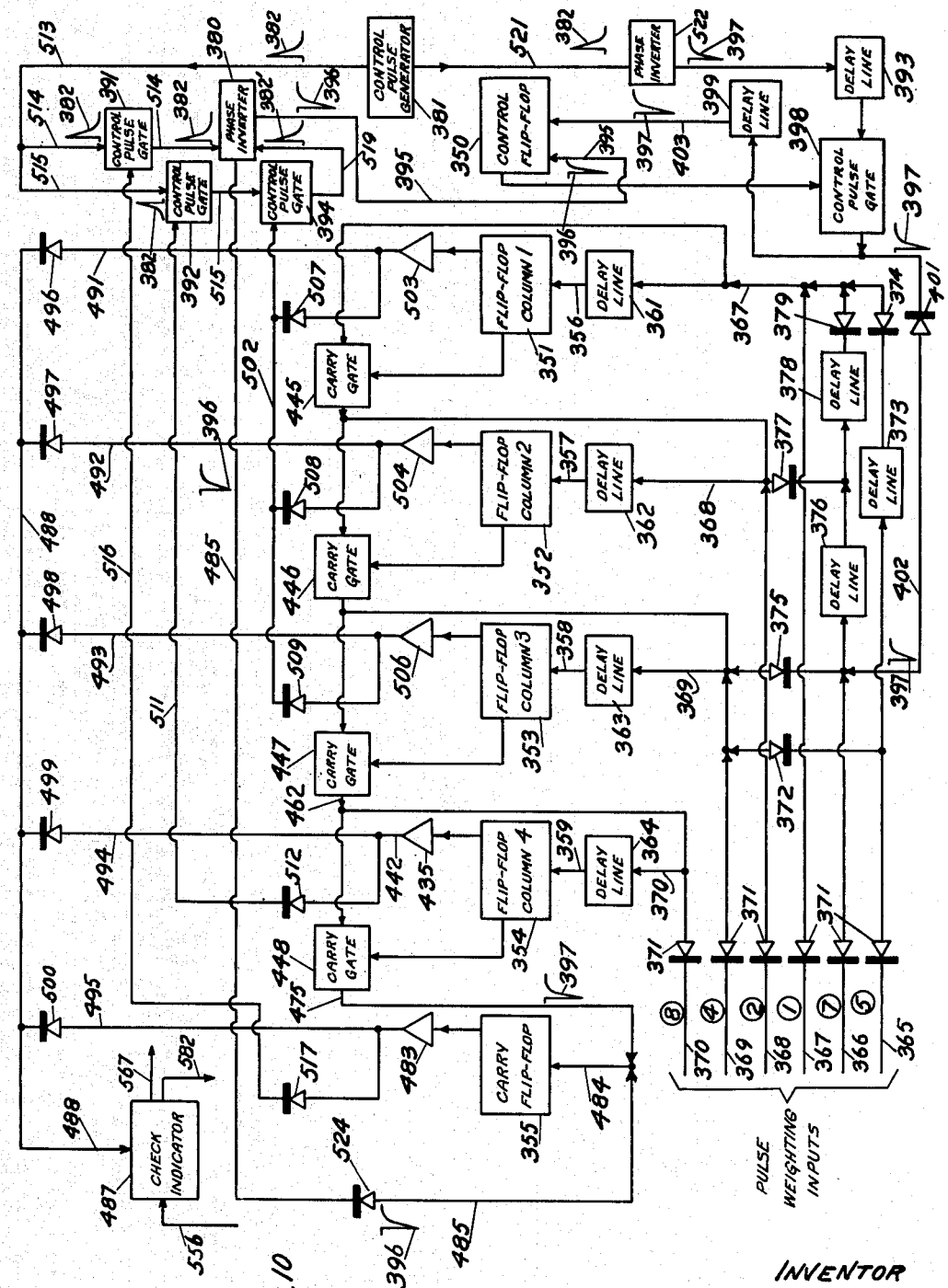

April 7, 1953

R. M. BLOCH 2,634,052

DIAGNOSTIC INFORMATION MONITORING SYSTEM

Filed April 27, 1949

INVENTOR
RICHARD M. BLOCH
BY Elmer J. Gorn
ATTORNEY

April 7, 1953 R. M. BLOCH 2,634,052
DIAGNOSTIC INFORMATION MONITORING SYSTEM
Filed April 27, 1949 10 Sheets-Sheet 10

INVENTOR
RICHARD M. BLOCH
BY Elmer J. Gorn
ATTORNEY

Patented Apr. 7, 1953

2,634,052

UNITED STATES PATENT OFFICE 2,634,052

DIAGNOSTIC INFORMATION MONITORING SYSTEM

Richard M. Bloch, Waltham, Mass., assignor to Raytheon Manufacturing Company, Newton, Mass., a corporation of Delaware Application April 27, 1949, Serial No. 89,871

41 Claims. (Cl. 235—61)

This invention relates in general to the handling of information in the form of time-varied electric waves, and more particularly to methods of and means for supervising the accuracy of and correct handling of such information.

It is known to supervise or monitor the identity of an electric wave which is being transferred from one place to another by means of another electric wave identical with the first and transferred therewith or subsequently thereto. Such a procedure requires either complete duplicate handling equipment or a complete repetition of the operation being supervised. Likewise, it is known, in the art of electronic and electrical computing machines, to supervise the operations of such machines by sending the same problem through twice simultaneously or twice in succession. The former process again requires complete duplicate equipment, and the latter process obviously consumes double the time required merely to perform the desired operations.

The present invention provides means to monitor information in the form of time-varied electric waves which creates for each item of information a characteristic time-varied electric wave of a prescribed short duration which is employed as an indicator and is thereafter carried with the main electric wave as an additional, readily separable part thereof. Each time the main electric wave is handled, the indicator is created anew, and the new indicator is then compared with the indicator that is carried with the main electric wave for the purpose of ascertaining whether or not the main electric wave has undergone any change. The amount of additional equipment required to provide the indicators is approximately twenty per cent as extensive as the equipment that handles the main information, while the simultaneity of systems employing complete duplicate equipment is substantially preserved. Further, the present system is diagnostic for the reason that a new indicator is created from the main wave each time it is handled or transferred, so that the place in a complete system where a fault may have occurred can be readily known. The present invention is adaptable to use with limitless forms of information handling systems and various kinds of wave forms. It has utility, for example, in telemetering systems of all kinds and varieties, and in electrical computing machines of all degrees of complexity.

In its use in computing machines, the invention is particularly valuable in that it may be modified in many ways to supervise not only the identity of information which is transferred from place to place within the machine, but also the accuracy of mathematical operations performed upon such information. Thus, for example, an addition of two quantities which are represented by first and second electric waves is supervised by means which creates from each wave a short indicator wave in accordance with a prescribed scheme, then creates from the sum of the two original waves a third short indicator wave, and then operates upon these indicator waves in a prescribed manner to produce an electric wave which has only one possible form if the addition was performed correctly. The means for accomplishing this supervision is again small in extent as compared with the main computing equipment, and functions practically simultaneously therewith. Other processes of subtraction, multiplication, and division are supervised by analogous means and methods.

While the invention is not limited in its employment to any particular form of electric wave, it is most easily understood in connection with systems which store and transfer information in the form of electric waves consisting of groups of discrete pulses. Digital telemetering systems and computing machines employing the binary system of notation employ such groups of discrete pulses to represent information items. In one form, a group of discrete pulses represents a binary number by providing a pulse space in a train of time-spaced spaces for each digit of the number, the presence of an electric pulse in a space representing a "1" and the absence of a pulse in a space representing a "0."

When the information which is being handled in the binary notation system originates in the decimal system, it must be converted to the binary form. Similarly, end-product information is often converted to the decimal form. The present invention employs means which supervises the accuracy of such conversions, also, by creating indicators for the quantity being converted, the conversion product, and the unconverted remainder, the indicators being created in accordance with a scheme such that their sum results at all times in an electric wave which can have only one possible form if the conversion has been effected correctly.

The foregoing and other features of the invention will become more apparent from the detailed description of certain specific embodiments that follows. The description refers to the accompanying drawings, wherein:

Fig. 2 is a circuit diagram illustrating certain details of Fig. 1;

Fig. 3 is a block diagram illustrating one phase of the operation of Fig. 1;

Fig. 4 is a block diagram illustrating another phase of the operation of Fig. 1;

Fig. 5 is a diagram showing a group of time-spaced pulses representing an item of information in binary notation as handled in accordance with the invention;

Fig. 7 is a circuit diagram of an arrangement which may be employed for sensing or coincidence checking in the systems shown in Fig. 6 and Fig. 8;

Figs. 8A, 8B and 8C are modifications of the system of Fig. 8;

Fig. 9 is a block diagram of a suitable weighting circuit for use in the system of Fig. 8;

Fig. 10 is a block diagram of a system which supervises the accuracy of conversions between the binary and decimal systems of notation;

Fig. 11 is a chronological diagram illustrating the time relationship existing among certain of the pulses which are employed in the system of Fig. 10;

Fig. 12 is a circuit diagram illustrating details of certain parts of Fig. 10;

Monitoring the identity of information

Figure 1:
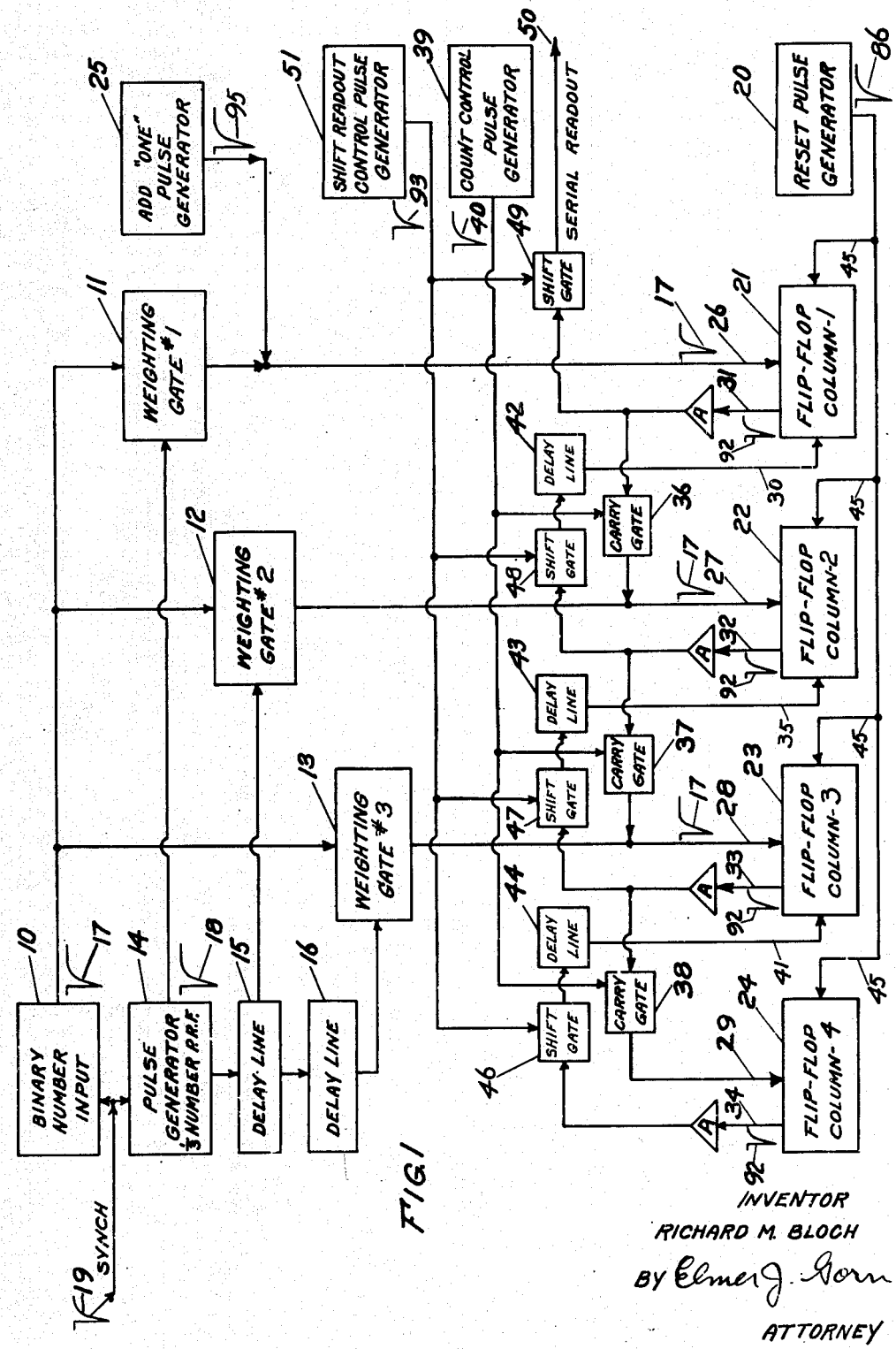
Fig. 1 is a block diagram of a system which generates a four-column binary indicator from any multi-columnar series of pulses and pulse spaces representing, for example, a binary number.

Referring now to Fig. 1, a binary number consisting of a chronological series of voltage pulses 17, for which an indicator is to be generated, is provided from a binary number input source represented by a block 10. The pulses 17 may be either positive or negative, as desired. In the present description, negative pulses are illustrated. The pulses 17 of the number from the block 10 are sequentially provided in parallel to three gates 11, 12 and 13, which may be called weighting gates #1, #2 and #3, respectively. The three weighting gates are normally closed, in the sense that they do not permit the pulse 17 to pass, and are operated to an open, or pulse-passing, condition by means of negative gate control pulses 18 furnished by a pulse generator 41 via two delay lines 15 and 16. The binary number consists of a chronological series of pulse spaces, each of which may or may not be occupied by a pulse 17, which spaces are repeated at a predetermined repetition frequency. The pulse generator 14 furnishes gate control pulses 18 at a pulse repetition frequency which is one-third that of the binary number. A synchronizing pulse 19, furnished from a suitable master timing source (not shown), is furnished to both the binary number input 10 and the pulse generator 14 in order that each gate control pulse 18 shall occur simultaneously with a predetermined number pulse 17 or pulse space of the binary number. The gate control pulse 18 is applied directly to weighting gate #1, and at the same time to the first delay line 15. The pulse which emerges from the first delay line 15 is applied directly to weighting gate #2 and at the same time to the second delay line 16. The pulse which emerges from the second delay line 16 is applied directly to weighting gate #3. The gate control pulse 18 is delayed in each delay line 15 and 16 by an amount equal to the spacing between two adjacent pulses 17 of the binary number which occupy adjacent pulse spaces. The effect of this arrangement is that pulses 17 which occupy successive pulse spaces of the binary number from the input 10 pass through successive gates from gate #1 to gate #3 and then back to gate #1.

Four "flip-flop" circuits, of a kind to be described below, are represented by blocks 21, 22, 23 and 24, respectively. These blocks are in columns 1, 2, 3, and 4, respectively, of a binary system register. The binary number pulse 17 which passes through weighting gate #1 is provided to the column 1 flip-flop 21 via a signal input line 26, the number pulse 17 passing through gate #2 to the column 2 flip-flop 22 via a signal input line 27, and the number pulse passing through gate #3 to the column 3 flip-flop 23 via a signal input line 28. The column 4 flip-flop 24 is provided with a signal input line 29. As will be explained below, each of the flip-flops 21 to 24, inclusive, is arranged so that it will change state each time a number pulse 17 is applied via its signal input line 26, 27, 28 or 29, respectively. Each of the flip-flops 21 to 24, inclusive, is provided also with a signal output line 31, 32, 33 and 34, respectively, in which negative output voltage pulses 92 appear. An amplifier A may be included in each output line, if desired. In each flip-flop, one state of the flip-flop represents the digit "1" standing in the column of the flip-flop, while the other state represents the digit "0" standing in the column. When the flip-flop changes from the "1" state to the "0" state, a pulse appears in its output line, as will be explained more in detail below.

The output line 31 of the column 1 flip-flop 21 is connected by way of a first carry gate 36 to the signal input line 27 of the column 2 flip-flop 22. The output line 32 of the column 2 flip-flop is connected by way of a second carry gate 37 to the signal input line 28 of the column 3 flip-flop 23. The output line 33 of the column 3 flip-flop is connected by way of a third carry gate 38 to the signal input line 29 of the column 4 flip-flop 24. The carry gates 36, 37 and 38 are all normally closed in the sense that they do not permit the output pulse 92 to pass, and are simultaneously operated to an open or pulse-passing condition by a negative pulse 40 furnished by a count control pulse generator 39 which is connected to all three carry gates in parallel. The pulse 40 furnished by the count control pulse generator 39 occurs simultaneously with each binary number pulse or pulse space, the generator 39 being controlled, if desired, by the same central synchronising mechanism (not shown) which provides the synchronizing pulse 19.

The four flip-flops 21 to 24, inclusive, and their associated carry gates 36 to 38, inclusive, may be termed a "register," here a four-column register. The simultaneous states of the individual flip-flops at any one instant define a four-column binary quantity, which quantity is said to "stand in the register" at that instant. The quantity which stands in the register at the end of the operation upon the binary number for which an indicator is created is the indicator. The manner in which the register is operated to create an indicator will be presently explained in greater detail in connection with Fig. 3.

The signal output line 34 of the column 4 flip-flop 24 is connected by way of a shift gate 46 and a delay line 44 to a first side input line 41 of the column 3 flip-flop 23. The signal output line 33 of the column 3 flip-flop is connected by way of a shift gate 47 and a delay line 43 to a first side input line 35 of the column 2 flip-flop 22. The signal output line 32 of the column 2 flip-flop is connected by way of a shift gate 48 and a delay line 42 to a first side input line 30 of the column 1 flip-flop 21. The signal output line 31 of the column 1 flip-flop is connected by way of a shift gate 49 to a serial read-out terminal 50. The shift gates 46, 47, 48 and 49 are all normally closed in the sense that they do not permit the output pulse 92 to pass, and are simultaneously operated to an open, or pulse-passing, condition by a negative pulse 93, furnished by a shift read-out control pulse generator 51 which is connected to all the shift gates in parallel. The shift read-out control pulse generator 51 is operated only when it is desired to remove or "read out" the information standing in the register, namely, the indicator of the main binary number. A reset pulse generator 20 which produces negative reset pulses 86 is connected in parallel to a second side input line 45 of each of the flip-flops 21 to 24, inclusive. The reset pulse generator is operated in cooperation with the shift read-out control pulse generator 51 during a read-out operation, as will presently be explained in connection with Fig. 4. The delay lines 42, 43 and 44 provide a time delay to the passage of the output pulses 92 furnished thereto which is substantially longer than the duration of a shift read-out pulse 93.

A single-pulse generator 25 which produces a single negative pulse 95 at the end of the indicator-creating operation, is connected to the signal input line 26 of the column 1 flip-flop 21 for the purpose of adding the binary quantity "1" to whatever binary quantity stands in the register at the end of the operation wherein an indicator is created, and prior to reading out the indicator. The purpose of adding 1 will also be presently explained.

Referring now to Fig. 2, the circuits therein illustrated are the column 1 and column 2 flip-flops 21 and 22, respectively. Considering the column 1 flip-flop 21, the circuit is basically an Eccles-Jordan circuit including first and second triodes 54 and 55, respectively, connected at their anodes to an anode voltage terminal B+, via anode resistors 56 and 57, respectively, and at their cathodes to a common ground via a cathode resistor 58, which is bypassed for alternating current by a suitable capacitor 59. An inductor 60 is connected between the anode resistor 57 of the second triode and the B+ terminal. A diode 84 is connected in shunt with the inductor, the cathode being connected to the B+ end thereof. Each anode of each triode is connected via a suitable parallel-resistance-capacitance circuit 61 or 62 to the control grid 64 or 71 of the other triode. The control grid 71 of triode 55 is connected to the output line 32 of the column 2 flip-flop 22 via the delay line 42, the shift gate 48, the first side input line 30, a capacitor 72, and a diode 73 in series, the anode of the diode 73 being connected to the grid 71. A resistor 75 is connected between the grid 71 and ground. A resistor 74 is connected between the cathode of the diode 73 and the cathode of the triode 55. By this connection to the grid of triode 55, an output pulse 92 from the column 2 flip-flop 22 is impressed upon the column 1 flip-flop 21 if the shift gate 48 is in an open condition. The reset pulse generator 20 is connected to the control grid 64 of triode 54 by way of the second side input line 45, a capacitor 87, and a diode 65 in series, the anode of diode 65 being connected to the grid 64 and the cathode of diode 65 being connected to the cathode of the triode 54 via a resistor 67. A resistor 66 is connected between the control grid 64 and ground.

Thus far, the circuit of the two triodes 54 and 55 will be recognized as the well-known Eccles-Jordan circuit which can be triggered at either of the control grids 64 or 71 by means of a negative pulse applied at the cathode of the diode 65 or 73, respectively. Each of the control grids 64 and 71 has a second diode 77 and 78, respectively, connected thereto at its anode. The cathodes of these second diodes are connected together and via a coupling capacitor 79 to the signal input line 26 which is connected to weighting gate #1. A resistor 80 is connected from the cathodes of the second diodes 77 and 78 to the cathodes of the triodes 54 and 55. A negative pulse 17 brought into the flip-flop via the input line 26 will change the state of the flip-flop regardless of its pre-existing state. A negative pulse 86 or 92, which is brought into the flip-flop at one side or the other only, will change the state of the flip-flop only if the triode to which it is applied is previously in a conductive state.

The output signal line 31 of the flip-flop is connected via a coupling capacitor 83 to the junction point 52 of the anode circuit resistor 57 of the second triode 55 and the inductor 60. The diode 84 is connected at its anode to said junction point. When the second triode 55 is rendered non-conductive, the potential of the anode thereof assumes a "high" state, and, when this triode is rendered conductive, the anode potential thereof assumes a "low" state. The Eccles-Jordan circuit of the flip-flop is so dimensioned that it can occupy only one state wherein the first triode 54 is conductive and the second triode 55 is nonconductive, or the opposite state, and its state is abruptly changed by a negative pulse such as the pulse 17, 86 or 92 properly applied thereto. When the second triode 55 is abruptly rendered conductive, current begins abruptly to flow through the inductor 60. During the initial surge of current, the junction point 52 of the inductor and the anode resistor 57 undergoes a correspondingly abrupt change in potential in the negative direction with respect to the B+ terminal, and thereafter a substantially exponential change in potential in the positive direction, returning eventually substantially to the potential level of the B+ terminal. These changes produce the output pulse 92. Any tendency of the junction point 52 to assume a potential which is positive with relation to the B+ terminal is inhibited by the diode 84 which is shunted across the inductor 60, since the diode becomes conductive when that happens and short-circuits the inductor. Thus, when the second triode 55 is abruptly rendered nonconductive, no positive pulse corresponding to the negative pulse 92 is produced. The diode 84 is thus employed as a diode clamp, and it will be recognized by those skilled in the art that a crystal or other form of dry rectifier may be employed in place of an electron-tube diode, if desired.

The circuit of the column 2 flip-flop 22 is identical to that of the column 1 flip-flop 21 and will not be described in detail. Similar elements of both circuits bear the same reference characters. Likewise, the column 3 and 4 flip-flops 23 and 24, which are not shown in Fig. 2, have similar circuits to that of the column 1. The column 4 flip-flop 24, however, has no input line to the first side thereof, and accordingly, in column 4, the first side input diode 73, and its resistor 74 and capacitor 72, may be omitted, if desired.

Each flip-flop is operated by negative pulses. The input pulse 17 from a weighting gate is a negative pulse applied to the cathodes of input diodes 77 and 78 in parallel. This pulse cuts off the triode 54 or 55 which is conductive, thereby rendering the other triode conductive. The output pulse 92 from a shift gate 46, 47 or 48 is negative, and is applied through the capacitor 72 and first side input diode 73 to the control grid 71 of the second triode 55, and is effective to cut off triode 55 should that tube be conducting when pulse 92 arrives. The reset pulse 86 from the reset pulse generator 20 is negative, and is applied through a capacitor 87 and second side input diode 65 to the control grid 64 of the first triode 54, and is effective to cut off triode 54 in the event that the tube is conducting when the reset pulse 86 arrives. Thus, the pulse 17 from the weighting gate causes a change of state of the flip-flop regardless of the state thereof at the time pulse 17 arrives, while the reset pulse 86 or the output pulse 92 changes the state of the flip-flop only if the triode to which it is applied is conductive at the time of application.

It is important to remember that the output of each flip-flop 21 to 24, inclusive, is either a negative pulse 92 or no pulse at all. As a matter of definition, it may be stated that, when the second triode 55 is in a nonconductive condition, a "1" stands in the flip-flop, and, when triode 55 is in a conductive condition, a "0" stands in the flip-flop. The basis of this definition is that the negative pulse 92, which the flip-flop will furnish when the second triode 55 is rendered conductive, is employed to represent the digit 1 being extracted from the flip-flop. In accordance with this definition, when the negative reset pulse 86 is furnished to the flip-flops, it causes all four flip-flops to stand simultaneously at zero.

Figure 13:
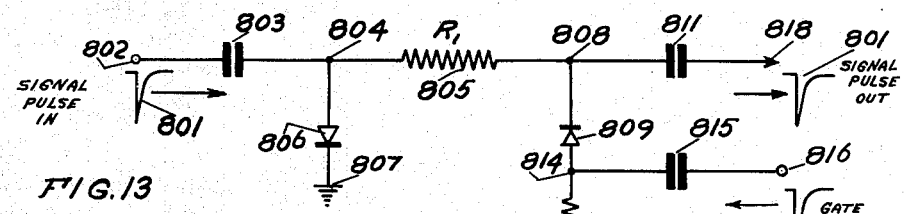
Figs. 13, 14 and 15 are circuit diagrams illustrating various forms of gate circuits which may be employed in carrying out the invention.

The various gates of the system of Fig. 1 may be constructed in accordance with Fig. 13, if desired. In Fig. 13, a signal input pulse 801 is applied at a signal input terminal 802. Terminal 802 is connected to one side of an input coupling capacitor 803, which is connected at the other side to the junction 804 of a resistor 805 and a unidirectional conductor 806. The unidirectional conductor 806 and others shown and described herein may be of any desired form, for example, an electron tube diode or a crystal or other form of rectifier may be used, and will hereafter be referred to simply as a rectifier. The function of rectifier 806 is essentially that of a clamp, and it is poled to conduct current to ground at 807 whenever the junction 804 becomes positive with respect to ground. In this manner, the signal pulse is maintained practically purely negative. Resistor 805 is connected at its other end to the junction 808 of a second rectifier 809 and one side of an output coupling capacitor 811. The second rectifier 809 is connected to ground at 812 via a second resistor 813, and is poled to become conductive between ground and junction 808 whenever the junction 808 is negative with respect to the grounded side of the rectifier. The junction 814 of this grounded side and the second resistor 813 is connected via a gate pulse coupling capacitor 815 to a terminal 816 via which a negative gate pulse 817 is introduced. The output coupling capacitor 811 is connected at its free side to a signal pulse output terminal 818.

The values of resistors 805 and 813 are designated as $R_1$ and $R_2$, respectively. $R_1$ is much greater than $R_2$, for example, these may be 5,600 ohms and 300 ohms, respectively. The peak magnitude of the gate pulse 817 should be at least as great as that of the signal pulse 801, and is preferably slightly greater. If these conditions are provided, the gate pulse 817 is able to so bias the grounded side of the second rectifier 809 with respect to ground that the signal pulse 801 cannot render junction 808 negative with respect to said grounded side. Thus, if the gate pulse 817 and the signal pulse 801 occur simultaneously, the signal pulse 801 passes through capacitor 803, resistor 805, and capacitor 811 to the output terminal 801. In this condition, the gate is said to be "open." On the other hand, if the gate pulse 817 is absent, the signal pulse 801 is able to render junction 808 negative with respect to the grounded side of the second rectifier 809, and is therefore conducted to ground at 812 via the second resistor 813. The resistance of the rectifier 809 when conductive is about 100 ohms. Accordingly, the total resistance from the input terminal 802 to ground at 812 is 6,000 ohms, and junction 808 is 400 ohms from the grounded end of this resistance. Thus, there is in effect a voltage divider from the input terminal 802 to ground at 812 by which the peak voltage of the signal pulse 801 is reduced to about $\frac{4}{60}$ of the original value. The resulting amount of signal pulse voltage that reaches the output terminal 818 is so small as to be inoperative upon the circuits that follow, and, therefore, the gate is said to be "closed" in this condition.

The gate of Fig. 13 may be employed as a weighting gate 11, 12 or 13 in the system of Fig. 1 by bringing the binary number pulse 17 to the signal input terminal 802 and the gating pulse 18 to the gate pulse terminal 816 thereof. It may be employed as a shift gate 46, 47, 48 or 49 by applying the flip-flop output pulse 92 to the signal input terminal 802 and the shift readout pulse 93 to the gate pulse terminal 816, or as a carry gate 36, 37 or 38 by applying the count control pulse 40 to the gate pulse terminal 816 in place of the shift read-out pulse 93.

Figure 14:
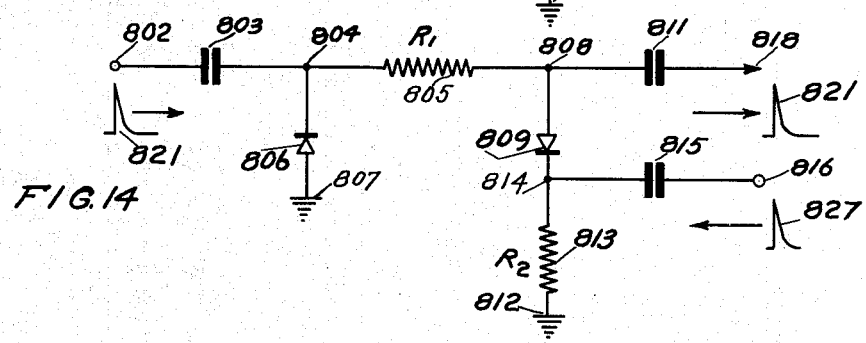
Figure 15:
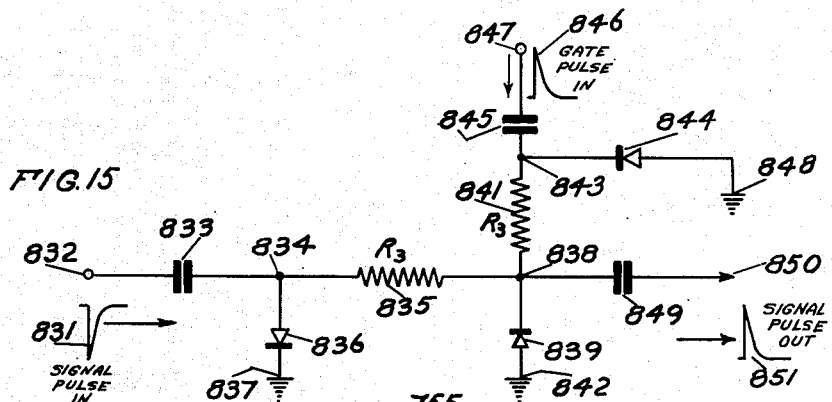

In the gate of Fig. 13, the signal and gate pulses 801 and 817, respectively, are both negative, and the output pulse is negative. In Fig. 14, this gate is modified by inverting the connections to the two rectifiers 806 and 809 so that a positive input pulse 821 and a positive gate pulse 827 will produce a positive output pulse 821. Otherwise, the gates of Figs. 13 and 14 are similar in construction and operation. Fig. 15 illustrates a somewhat different gate wherein the polarities of the signal and gate pulses are opposite.

In Fig. 15, a negative signal pulse 831 is brought to the input terminal 832 and coupled via a first coupling capacitor 833 to the junction 834 of a first resistor 835 and first rectifier 836. Rectifier 836 is connected to ground at 837, and poled to clamp the input pulse 831 to be substantially purely negative, in the same manner as rectifier 806 in Fig. 13. Resistor 835 is connected at its other end to the junction 838 of a second rectifier 839 and a second resistor 841. The second rectifier 839 is connected to ground at 842 and poled oppositely to the first rectifier 836. The other end of resistor 841 is connected to the junction 843 of a third rectifier 844 and one side of a gate pulse coupling capacitor 845. A positive gate pulse 846 is brought to the other side of the capacitor 845 via a gate pulse input terminal 847. The third rectifier 844 is connected to ground at 848 and poled to clamp the gate pulse 846 to be substantially purely positive. Junction 838 is connected via a signal output coupling capacitor 849 to a signal output terminal 850.

Resistors 835 and 841 are preferably of the same value, $R_3$. In the absence of a signal pulse 831, the gate pulse 846 passes through resistors 841 and 835 and rectifier 836 to ground at 837. The potential level of the gate pulse at junction 838 is sufficiently high so that a positive signal pulse 851 appears at the output terminal 850. When the signal pulse 831 is present, it substantially cancels the positive gate pulse at junction 838. To this end, the magnitudes of the two input pulses 831 and 847 are preferably adjusted so that, when both are present, rectifier 839 becomes at least slightly conductive. The gate of Fig. 15 is thus one in which, when a signal pulse 831 is present, there is no output pulse, but, when the signal pulse 831 is absent, there is an output pulse 851 of the opposite polarity. This gate has use in the present invention, as will be described later. Although many other forms of gates can be devised, and some others will be described later, an understanding of the foregoing gates will aid in the explanation of the operation of many parts of the systems described herein.

Referring now to Fig. 3, the diagram of this figure illustrates the operation of the four-column register of Fig. 1 when binary number pulses 17 are being brought thereto to create an indicator. During each step of this operation, the carry gates 36, 37 and 38 in Fig. 1 are all open, since the count control pulse 40 occurs simultaneously with each binary number pulse 17 or pulse space, while the shift gates 46 to 49, inclusive, are closed throughout the operation. A negative pulse 86 from the reset pulse generator is applied to the register, that is, to all the flip-flops in parallel, prior to commencing the operation. By so doing, triode 54 of each flip-flop is rendenered nonconductive, thereby rendering triode 55 of each flip-flop conductive. Then, when the first pulse 17 from a weighting gate is introduced into the register, it renders the triode 55 of the flip-flop to which it is applied nonconductive, so that a 1 stands in the flip-flop. Thus, if there is a pulse 17 in the first binary number space, column 1 flip-flop 21 stands at 1 when the pulse is applied through weighting gate #1. In the case where the binary number has a second pulse 17 in the second binary number space, this second pulse is applied through weighting gate #2 to column 2 flip-flop 22, thereby causing flip-flop 22 also to stand at 1. Consider now that the third binary number space of the input number is a zero. Then no pulse is applied to column 3 flip-flop 23 when weighting gate #3 is opened, and flip-flop 23 stands at zero. If further the fourth binary number space contains a pulse 17, this fourth space pulse is applied through weighting gate #1 to column 1 flip-flop 21, and initiates the following sequence of events. First, the fourth column number pulse 17 renders triode 54 of column 1 flip-flop 21 nonconductive and therefore renders triode 55 of the same flip-flop conductive. As a result, column 1 flip-flop 21 produces an output pulse 92 in its output line 31 and then stands at zero. The second event that takes place is that output pulse 92 from column 1 flip-flop 21 is carried via output line 31 to input line 27 of column 2 flip-flop 22 where it is effective in the same manner as a binary number pulse 17 from weighting gate #2. Therefore, column 2 flip-flop 22 is caused to stand at zero and to produce an output pulse 92 in its output line 32, which provides the pulse 92 to the input line 28 of column 3 flip-flop 23. It will be remembered that flip-flop 23 has, to this point, been standing at zero, and now is caused to stand at 1 by the output pulse 92 from the column 2 flip-flop 22. Thus, the register has performed the addition of binary number 1 to binary number 0 1 1 and now stands at the sum of those numbers, which is 1 0 0 in the binary system.

In the same fashion, the register illustrated in Fig. 3 continues to add digits represented by pulses 17 applied to the various flip-flops in columns 1, 2 and 3. However, the register shown in Fig. 3 differs from an ordinary adding device in that it is limited to four columns. Thus, when this register arrives at binary 15, which is expressed 1 1 1 1 in the binary system, the addition of a single pulse in column 1, namely, the addition of binary 1, causes the register to stand at 0 0 0 0. As is known, the binary representation of 16 is 1 0 0 0 0, but the register shown in Fig. 3 is lacking a fifth column, and, therefore, represents binary 16 by 0 0 0 0. Thus, binary 17 is represented by 0 0 0 1, which is the same as the binary representation of 1. It is apparent, therefore, that the register shown in Fig. 3 counts up to 15 and starts over again at zero with 16, thereafter counting 17 to 31 in the same manner as 1 to 15, respectively, and starting over again with 32. This process is repeated at 48, 64, and all integral multiples of 16. The register of Fig. 3 is accordingly called a "modulo 16" counter. It has the property that regardless of the magnitude of a binary number that is provided from the binary number input 10, after the entire binary number has been applied to it as shown in Fig. 1, it stands at a particular four-column binary number which is arrived at by a process in which the columns of the original binary number being treated are weighted, from right to left, in the fashion 1 2 4 1 2 4 1 2 4, and then the weighted sum of those columns wherein there is a "1" is taken in the fashion modulo 16 as set forth above; that is, the first column binary digit commencing at the right-hand side of the binary number input is applied to column 1, the digit of the second column to the left to column 2, the digit of the third column to the left to column 3, the digit of the fourth column to the left to column 1, etc. As will be recognized, a digit in column 3 represents binary number 4, a digit in column 2 represents binary number 2, and a digit in column 1 represents binary number 1. Hence, the various columns of the original binary number input are considered to be weighted in the manner set forth, and, therefore, the gates 11, 12 and 13 are called "weighting gates."

Fig. 4 illustrates the register of Fig. 1 as arranged to read out the information stored therein. The four-column binary number indicator which is generated by the register may be read out of the register at any desired pulse repetition frequency which is controlled by the frequency with which the reset pulse generator 20 produces reset pulses 86. The shift read-out control pulse generator 51 produces a shift read-out pulse 93 substantially simultaneously with the production of each reset pulse 86, so that the shift gates 46 to 49, inclusive, are all opened each time a reset pulse 86 is produced. Consider, for example, that the four-column binary number 1 1 0 1 stands in the register. Now apply a reset pulse 86 from the reset pulse generator 20 to the register. This pulse is applied to the first triode 54 of each flip-flop, which triode is conductive in each flip-flop which stands at 1 and nonconductive in each flip-flop which stands at zero. Being negative, the pulse 86 renders triode 54 nonconductive in each flip-flop that stands at 1, namely, the column 4, 3 and 1 flip-flops 24, 23 and 21, respectively, causing all the flip-flops to stand at zero. In the case of the column 4, 3 and 1 flip-flops 24, 23 and 21, respectively, this change causes the second triode 55 to become conductive, and, therefore, each of flip-flops 24, 23 and 21 produces an output pulse 92 in output lines 34, 33 and 31, respectively. The output pulse 92 from line 31 is available via the serial read-out terminal 50 (Fig. 1) to a succeeding circuit, and may be said to have been "read out." Thus, the serial read-out terminal 50 may be connected to the memory of a complete computer system (not shown), where its output can be stored together with the original binary number, in the manner illustrated in Fig. 5, for example, and through the memory to the word input line of Fig. 6, as will presently appear. After suitable delay furnished by the delay lines 44 and 43 which permits the output pulse 92 from the first column flip-flop 21 to be removed, the reset and shift read-out pulses 86 and 93, respectively, to terminate, and the shift gates 46 to 49, inclusive, to become closed, the output pulses 92 in lines 34 and 33, respectively, are provided to the control grids 71 of the second triodes 55 of the column 3 and 2 flip-flops 23 and 22, respectively. As a result, the second triode 55 of each of columns 2 and 3 is again rendered nonconductive, so that a 1 stands in each of columns 2 and 3. Since the column 2 flip-flop 22 produces no output pulse 92, the column 1 flip-flop 21 stands at zero. Thus, in response to the first reset pulse 86 from the reset pulse generator 20, the binary number 1 1 0 1 is shifted one column to the right in the register which now stands at 0 1 1 0, and the extreme right-hand digit of the original number has been read out. Because of this shifting action, the register employed as in Fig. 4 is termed a "shift register."

Similar considerations to the foregoing make apparent the fact that each reset pulse 86 causes the number standing in the shift register to shift one column to the right and simultaneously causes the extreme right-hand digit to be read out. Thus, the repetition rate with which a number standing in the register is read out is determined by the repetition rate of the reset pulses 86. The number 1 1 0 1 can, therefore, be read out as 1 1 0 1 at any pulse repetition frequency desired.

If desired, a binary number can be serially read into the shift register of Fig. 4 by applying the number at an input line 81 brought into the first side of the column 4 flip-flop 24. This input line is connected to the flip-flop as line 30 is connected to flip-flop 21 in Fig. 1, for example. The process of reading in is to apply the first column binary number information via line 81 to act upon flip-flop 24, and then to shift the information to the right in the register with a reset pulse 86. This process is repeated until the binary number has been read into the register. Obviously in this arrangement, a shift register constructed as shown in Fig. 4 may have as many columns as are necessary to accept the incoming binary number. A shift register employed in this manner has utility in a system to be described below. The reading out of binary-form information so stored in the shift register is exactly the same as described above.

The function of the shift gates 46, 47, 48 and 49 and the carry gates 36, 37 and 38 now becomes apparent. Referring again to Fig. 1, it will be noted that the output lines 31, 32 and 33 are each connected in parallel to an input to both adjacent flip-flops. The carry gates 36, 37 and 38 are opened when it is desired to carry the output from a flip-flop of one column to the next higher column flip-flop, that is, when a binary number is being weighted and information is being put into the register to generate an indicator. The shift gates 46, 47, 48 and 49 are opened when a number is being read out of the register. Therefore, the count control pulse generator 39 provides its pulse 40 to open the carry gates 36, 37 and 38 in synchronism with the pulses 17 of the binary number which is being weighted, and the shift read-out control pulse generator 51 provides its pulses 93 to open the shift gates 46, 47, 48 and 49 simultaneously with the reset pulses 86 of the reset pulse generator 20. In this manner the two functions of the register of Fig. 1 are maintained separate and distinct.

When a binary number is treated in the foregoing apparatus, the four-column binary number that is generated in the register may be termed an "indicator" for the reason that it has a characteristic value which depends upon the original binary number. Since the indicator is generated by a method of weighted count, that is, a method wherein each column of the original binary number is weighted in accordance with a prescribed scheme prior to being counted, the indicator may also be termed the "weighted count of the binary number."

For the purpose of monitoring or supervising the identity of a binary number in any system, the weighted count or indicator is preferably generated immediately upon the creation of the binary number itself, and thereafter carried with it throughout the complete computer system. For example, a binary number and its count are illustrated in Fig. 5, where a fifteen-column binary number and its weighted count are shown. On line A—A of Fig. 5 there is illustrated, starting at the left-hand end, a fifteen-column binary number comprising pulses 17, each of which represents the digit 1, and empty pulse spaces 98, each of which represents a zero. The fifteen-column binary number shown on line A—A thus represents the binary number 1 0 0 1 1 0 1 1 0 1 0 1 1 0 1 which is shown on line B—B. Following the number to the right, there is a single space 96 which is reserved for the algebraic sign of the number, as is desirable when the number represents a mathematical quantity. In the present example, the absence of a pulse in the space 96 is representative of a (+) sign, and the presence of a pulse in that space is representative of a (—) sign. In the example shown in Fig. 5, the sign of the fifteen-column binary number is (+) as shown on line B—B, since there is no pulse present in space 96 in line A—A. Further to the right beyond the sign space 96 are the pulses of the weighted count, which constitute a four-column binary number. The weighted count in the present example is the binary number 0 0 1 0 where the digit 1 is represented by a single pulse 97 in the second column, the rest of the pulse columns being blank. The weighted count shown in Fig. 5 was generated by weighting columns of the binary number, starting at the right-hand end, in accordance with the arrangement set forth above. However, column 96, reserved for the algebraic sign, is, in this example, included with the number so that actually 16 columns were weighted. The reason for this is that for mathematical purposes it is deisrable to know not only when a pulse has been lost or gained in the number itself, but whether or not the algebraic sign is correct. Weighting the binary number and its sign in Fig. 5 in accordance with the weights 1 2 4 1 2 4 1 2 4 etc., from right to left, would yield a weight of 17, which is binary number 0 0 0 1. However, since the number zero is the same in both the binary and decimal systems, that is, the same for base 2 and base 10, binary number 1 is added to the weighted count 17 in order that the binary number and its count may never both simultaneously be zero. Thus, the weighted count shown in Fig. 5 is 18, or binary number 0 0 1 0, instead of 17, as would be expected. Binary number 1 is added in Fig. 1 by means of the add 1 pulse generator 25 which is operated to add 1 pulse through the column 1 flip-flop 21 at the end of the generation of a weighted count or indicator. In this manner, if a pulse is lost or gained in any binary number or its weighted count, the fact can be detected by apparatus to be described below.

As has been set forth, it is preferable, once a binary number and its sign appear in a system, immediately to generate an indicator which is here a weighted count in the form of a four-column binary number, and to carry the indicator at all times with the original binary number and its sign. The arrangement shown in Fig. 5 which includes the number, its sign, and its weighted count in one group of pulses, is termed "one word." One word for a fifteen-column binary number, its sign, and a four-column indicator includes 20 columns. In a conservative system, each pulse space may be ten microseconds wide and each pulse, when it occurs, one microsecond wide within that space. This provides ample separation between pulses and ample opportunity to detect the absence of a pulse indicating a zero in a particular column. A twenty-column word, as shown in Fig. 5, is, with this column interval, 200 microseconds long, or one five-thousandths of a second. With such rapidity of operation, it should be obvious that a means of checking the identity of a number and its sign each time they are handled is of extreme value, if the speed with which they can be handled is to be enjoyed. It is possible to employ the present checking system with its characteristic indicators in various systems, including all forms of pulse telemetering and pulse-type calculating systems.

Figure 6:
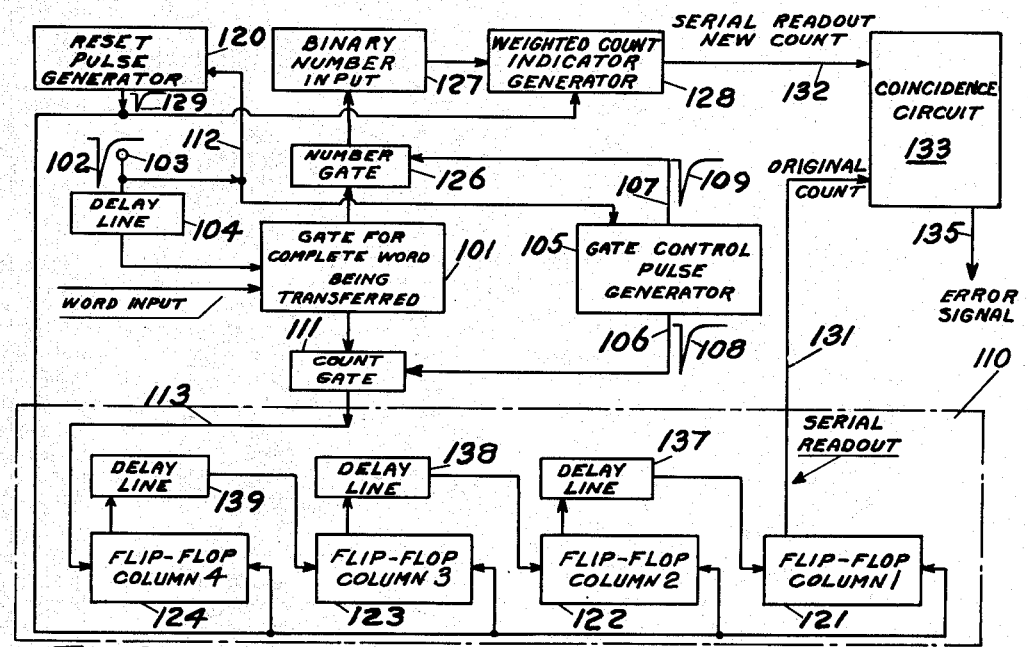
Fig. 6 is a block diagram of a system which supervises the identity of a group of pulses like that shown in Fig. 5 which is being transferred from one location to another.

Referring now to Fig. 6, the apparatus there shown supervises the identity of a binary number which has been converted to a word of the kind shown in Fig. 5. In systems which employ binary notation, particularly, for example, calculating machines, the entire word may be stored for a period of time in a memory system (not shown). Examples of such memory systems are mercury delay lines and recirculating circuits for short-term storage, or magnetic tapes which are moved mechanically for long-term storage. Whenever it is desired to inject a particular bit of information into a calculation or a presentation of information, the binary number or binary pulse series which represents the information is extracted from the memory. The apparatus shown in Fig. 6 accepts the word, which includes the binary number information, separates the number and its sign from the indicator, stores the original indicator in a register similar to that shown in Fig. 1, generates from the number and its sign a new indicator in a weighted count indicator generator similar to that shown in Fig. 1, and then compares the original indicator with the newly generated indicator to determine whether or not the binary number that has been extracted from the memory is the same as the binary number which was furnished to the memory.

The apparatus of Fig. 6 includes a gate 101 into which is introduced the word which is being transferred from memory. A synchronizing or "clock" pulse 102, which is a pulse furnished by any suitable central control pulse generator for the purpose of initiating the operation of the apparatus, is applied at an input terminal 103, which is connected in parallel to a delay line 104 and a gate control pulse generator 105. The gate control pulse generator has two output lines 106 and 107 in the first of which it provides a control pulse 108 and in the second of which it provides a control pulse 109, when it is triggered by the clock pulse 102. The gate control pulse generator 105 will be of any suitable form, for example, a multivibrator, which produces the pulses 108 and 109 with a separation of substantially four columns of the word, as shown on line C—C in Fig. 5. The clock pulse is furnished also to the word input gate 101 through the delay line 104 and opens the gate to call the word out of the memory at about the same time that the first gate control pulse 108 is generated by the gate control pulse generator 105. The control pulse 108 goes to a count gate 111, via line 106, for the purpose of opening that gate. The indicator, which is the four-column binary number having the pulses of the weighted count, appears first; that is, the word appears to be coming out of the memory with the extreme right-hand column in Fig. 5 appearing first.

The first four columns of the word occur when the count gate 111 is open and are presented to a four-column register 110 like that of Fig. 4, comprising flip-flops 121 to 124, inclusive, and delay lines 137 to 139, inclusive, corresponding to flip-flops 21 to 24, respectively, and delay lines 42 to 44, respectively, in Fig. 4, via an input line 113 to the column 4 flip-flop 124 which corresponds to the input line 81 of Fig. 4. All four flip-flops in the shift register 110 are previously cleared to stand at zero by a reset pulse 129 from a reset pulse generator 120, similar to the reset pulse generator 20 of Fig. 1. The reset pulse generator 120 is set into operation by the clock pulse 102 via line 112 and generates sufficient reset pulses 129 to clear the shift register and read in the weighted count of the word. Since there is no need for the separation of two functions as in Fig. 1, shift register 110 is not provided with shift gates. There now stands in the shift register 110 the original weighted count 0 0 1 0 of the word (Fig. 5) being transferred.

Between the fourth and fifth pulse spaces of the word being transferred, the gate control pulse generator 105 provides the second control pulse 109 in line 107 which opens a number gate 126, which gate remains open for the rest of the word, namely, for 16 pulse spaces, or, in the particular example set forth above, for 160 microseconds. Accordingly, the sign and the entire fifteen-column binary number are furnished to a binary number input 127 similar to the binary number input 10 of Fig. 1. This may be any suitable arrangement for providing the binary number pulses with proper polarity or shape and, if not needed, may be omitted. In any event, the number and its sign are provided to a weighted count or indicator generator 128 which incorporates all the features of the circuit shown in Fig. 1, including a similar four-column register wherein a new weighted count or indicator is generated and stored. If the binary number and its sign have not been altered in the handling or in the memory, the weighted count which is generated in the generator 128 and the original weighted count which is stored in the shift register 110 are identical.

The original count and the newly generated count are read out simultaneously through lines 131 and 132, respectively, into a coincidence circuit 133 under the control of the reset pulse generator 120. The reset pulse generator is again actuated by any suitable means (not shown), and provides the reset pulses 129, which are furnished simultaneously to the shift register 110 and the register of the new indicator generator 128, containing the original and newly generated weighted counts, respectively. In the same manner as described above, the pulses of the two weighted counts appear in the serial read-out lines 131 and 132, respectively. Corresponding pulses of each weighted count appear simultaneously at the coincidence circuit 133, which has the function of detecting when the simultaneously presented pairs of pulses or pulse spaces are alike and when they are different from each other. Should the two weighted counts be identical, that is, should their corresponding pairs of pulses or pulse spaces be the same, the system which the invention is supervising is permitted to proceed. On the other hand, should the pulses or pulse spaces of any corresponding pair in the two weighted counts differ, that is, if one pulse space has no pulse in one weighted count and the corresponding pulse space has a pulse in the other weighted count, an error signal will appear in output line 135, which signal may be employed to stop the supervised system, give an alarm, or indicate where in the supervised system the fault lies, as desired.

Fig. 7 illustrates a suitable coincidence circuit 133 for use in the apparatus of Fig. 6. One of the input lines, for example 132, is brought to a cathode follower 141 which accepts a weighted count negative pulse 97 via a capacitor 142 at its input and provides a pulse 140 of the same polarity across the output resistor 143 thereof. The cathode follower is provided for isolating purposes only, and being a well-known device is not further described. The negative pulse 140 is carried via a coupling capacitor 144 to a gate 116 of the kind shown in Fig. 15, including in series a resistor 145, and a rectifying device 146 poled to conduct negative pulses to ground at 147. The rectifying device 146 and other similar rectifying devices in this circuit may again be any suitable unidirectional conductor, for example, a diode electron tube device or a crystal, and these devices will be hereafter referred to by the term "rectifier." A positive pulse 150, which will be termed a "clock pulse" is introduced at a first clock pulse input terminal 151, which is connected via a coupling capacitor 152, a resistor 153, resistor 145, and a rectifier 154 in series to ground at 155. Rectifier 154 is poled to maintain the negative pulse 140 purely negative with relation to ground. At the junction point 156 between resistors 145 and 153, the negative pulse 140 and the positive clock pulse 150 are in voltage opposition and tend to cancel each other when they occur simultaneously. The resistors 145 and 153 are preferably of the same value, in the neighborhood of 500 ohms. A rectifier 157 is connected from the junction of coupling capacitor 152 and resistor 153 to ground at 158, and poled to maintain the positive pulse 150 purely positive with relation to ground.

The junction point 156 is connected via a coupling capacitor 160 to the control grid 161 of an electronic relay 162 which includes an electron tube 163. The cathode 164 of this electron tube is connected to ground at 165 and through a biasing resistor 166 and a voltage dropping resistor 167 in series to a source of potential B— which is negative with respect to ground. The control grid is connected via a current limiting resistor 168 to the junction of the biasing resistor 166 and the voltage dropping resistor 167, and is normally maintained at a potential which is negative with respect to that of the cathode 164 by an amount equal to the voltage drop in the biasing resistor 166. The anode 170 of the electron tube 163 is provided with voltage which is positive with respect to ground from a source B+ thereof via a load resistor 171 and the primary 172 of a transformer 173. The screen grid 174 of the tube 163 is provided with suitable potential from B+ via resistor 171 and an additional dropping resistor 175 in series, and is coupled to ground at 165 by a capacitor 176 which acts as a bypass capacitor in the usual manner. An additional bypass capacitor 178 is connected from the junction of resistors 171 and 175 to ground at 179. A rectifier 180 is connected across the primary winding 172, poled to conduct positive pulses from the anode side to the resistor side thereof. The bias on the control grid of the electron tube 163 is such that the tube is normally cut off or substantially so, so that a positive pulse applied to the control grid 161 causes an increase in current through the tube, and, therefore, a corresponding current surge in the primary winding 172. A negative pulse 181 is produced at the anode 170, since the lower end of the primary winding becomes negative with respect to the upper end thereof. Any positive pulse, that is, a pulse of the opposite polarity, which tends to develop in the primary winding 172 when the electron tube 163 is again returned toward cutoff, is substantially short-circuited by the shunt connected rectifier 180.

It will be recalled that the weighted count consists of a series of four pulse spaces, each of which may be blank or may contain a negative pulse 97. Clock pulses 150 are provided to the coincidence circuit by any suitable pulse generator with regularity, one for each pulse space of the weighted count and simultaneously with the pulses 97 should the latter exist. Thus, if a pulse 97 exists in the weighted count which is introduced on input line 132, it substantially cancels out the concomitant clock pulse 150, and there is no negative pulse 181 provided at the anode 170 of the relay 162. On the other hand, should a pulse space of the weighted count be vacant, the clock pulse 150 which is furnished during that pulse space is not cancelled, and is provided to the control grid 161 of the relay tube 163, thereby causing the negative pulse 181 to occur at the anode 170.

The secondary winding of the transformer 173 is made up of two parts 183 and 184 serially joined together and connected at their junction point to ground at 185. Accordingly, in response to the surge of current which produced pulse 181 in the primary winding 172, there appears at the free end of secondary section 183 a pulse 186 which is negative with respect to ground, and at the free end of secondary section 184 a pulse 187 which is positive with respect to ground. A path for the positive secondary pulse 187 to ground is provided via a coupling capacitor 191, a resistor 192, a rectifier 193 and a second resistor 194 in series to ground at 195. The rectifier 193 is suitably poled to pass the positive secondary pulse 187 to ground in this circuit. An additional rectifier 196 is connected from the junction of the coupling capacitor 191 and resistor 192 to ground at 197 and suitably poled to remove from this circuit any voltage which may appear which is negative with respect to ground. As a result, the positive pulse 187 which appears in the series circuit of resistor 192, rectifier 193 and resistor 194 is wholly positive with respect to ground. A path for the negative secondary pulse 186 is provided to ground at 201 via a resistor 202. A rectifier 203 is connected at one side to the junction of resistor 202 and secondary section 183, and to the other side 246 to a point 204 by way of which a connection is made to further circuit elements to be described below. Rectifier 203 is poled to conduct the negative pulse 186 to point 204.

The other weighted count input line 131 is connected to a second electronic relay 205 which includes an electron tube 206. The negative pulses 97 of the weighted count which is brought in via line 131 are applied to the control grid 207 of the electron tube 206 via a coupling capacitor 208. The anode 209 of the electron tube 206 is provided with anode potential from a source B+ thereof via a resistor 211 and the primary winding 212 of a transformer 213 in series. A rectifier 214 is connected in shunt with the primary winding 212, being poled to conduct a negative pulse from the anode end to the resistor end thereof. The cathode 215 of the tube 206 is connected directly to ground at 216 and to a source, B−, of potential which is negative with respect to ground via a biasing resistor 217 and a voltage dropping resistor 218 in series. The control grid 207 is connected to the junction of these two resistors via a current-limiting resistor 219. The screen grid 221 is provided with suitable potential from the B+ source via the anode resistor 211 and an additional dropping resistor 222 in series, and is bypassed to ground at 216 via a bypass capacitor 223. An additional bypass capacitor 224 is connected from the junction of the resistors 211 and 222 to ground at 225. The circuit of relay 205 will be recognized as similar in many respects to the circuit of relay 162. However, the bias resistor 217 of relay 205 is substantially smaller than the bias resistor 166 of relay 162 with the result that the electron tube 206 is normally in a conductive state. Thus, when a negative pulse 97 is applied to the control grid 207, the tube 206 becomes less conductive and a positive pulse 226 appears at the anode 209, since the lower or anode end of the primary winding 212 becomes positive with respect to the upper or B+ end thereof.

The secondary winding of transformer 213 consists of two sections 228 and 229 serially connected with their junction point grounded at 230. The secondary sections are so poled that a pulse 231 which is negative with respect to ground appears at the free end of section 228, and a pulse 232 which is positive with respect to ground appears at the free end of section 229. The free end of section 229 is connected to the junction point 233 of rectifier 193 and resistor 194 of the circuit of the positive pulse 187 which is provided by relay 162. By way of this connection, the positive pulse 232 is able to bias the rectifier 193 to a nonconductive state as far as positive pulse 187 is concerned. As a consequence, when the positive pulse 232 exists simultaneously with a positive pulse 187, positive pulse 187 proceeds along line 235 instead of being conducted to ground at 195.

The negative pulse 231 is connected to point 204 via a rectifier 236 which is suitably poled to conduct negative pulses to said point. It will be recalled that negative pulse 186 is also provided to point 204 via rectifying device 203.

The clock pulse 150 is provided also to a second clock pulse input terminal 238, which is connected by way of a coupling capacitor 241, resistors 242 and 243, and a rectifier 244, in series, to ground at 245. The junction of resistor 243 and rectifier 244 is directly connected to point 204, and this point is connected via a resistor 246 to ground at 247. The rectifier 244 is suitably poled to conduct positive pulses like the clock pulse 150 to ground at 245. Another rectifier 248 is connected from the junction 250 of resistors 242 and 243 to ground at 251, and is suitably poled to conduct negative pulses to ground. Still another rectifier 252 is connected from the junction of capacitor 241 and resistor 242 to ground at 253 and is suitably poled to conduct negative pulses to ground. This arrangement will be recognized as similar in many respects to gate 116, with inputs at point 204 and terminal 238, and an output at junction 250. A negative pulse 186 or 231 flows through resistor 243 to ground at 251 via rectifier 248, while the clock pulse 150 flows through resistors 242 and 243 to ground at 245 via rectifier 244. Thus, at junction point 250 either one of negative pulses 186 or 231 can be in opposition to the positive clock pulse 150. In this respect, junction point 250 and junction point 156 are similar.

Output line 235 is connected via a coupling capacitor 255 to the first control grid 256 of a double triode type electron tube 257. A resistor 258 is connected between the first control grid and ground at 259. Junction point 250 is connected via a coupling capacitor 260 to the second control grid 261 of the double triode 257, and a resistor 262 is connected from said second control grid to ground at 263. The two anodes 264 and 265 of the tube are connected together and via an anode resistor 266 to a source, B+, of anode potential and bypassed to ground at 291 via a bypass capacitor 292. The two cathodes 267 and 268 of the tube 257 are connected together and via a cathode resistor 269 to ground at 270. An additional electron tube 271 including an anode 272, control grid 273 and cathode 274 has its control grid 273 connected via a coupling capacitor 275 to the junction of the cathode resistor 269 and the cathodes of the double triode tube 257. Anode potential is supplied to the tube 271 from the source B+ of anode voltage via an anode circuit resistor 276. The cathode 274 of the tube 271 is grounded at 277 and connected via a biasing resistor 278 and current limiting resistor 279 to a source, B—, of potential which is negative with respect to ground. The grid 273 is connected to the junction of resistors 278 and 279 via a current-limiting resistor 280. The output signal connection 135 is made from the anode 272 of tube 271 via an output coupling capacitor 281.

The double triode tube 257 is normally conductive and self-biasing at the cathode by virtue of the cathode resistor 269 which may be approximately 3,000 ohms. When the positive pulse 187 proceeds along line 235 to the first control grid 256, it renders one triode section of the double triode tube 257 more conductive, so that a corresponding positive pulse 283 appears in the cathode resistor 269. When the clock pulse 150 which is introduced at clock pulse input terminal 238 is not opposed by a negative pulse 186 or 231, it is impressed upon the second control grid 261 and renders the other triode section conductive, causing the positive output pulse 283 to appear. The output tube 271 is normally cut off by the bias voltage in resistor 278, and is rendered conductive by the positive output pulse 283. This results in the production of a negative output pulse 284 in the output line 135, which is the error signal.

The operation of the circuit of Fig. 7 should now be readily understood. There are four conditions which the circuit is called upon to determine. These are as follows:

1. The condition in which a vacant pulse space, representative of a zero, is presented in line 131, and a similar vacant pulse space is presented in line 132. In this condition, the clock pulse 150 introduced at terminal 151 is not opposed at point 156, and the negative and positive pulses 186 and 187 are generated, while, at the same time, the negative and positive pulses 231 and 232 are not generated. Consequently, positive pulse 232 being absent, positive pulse 187 proceeds to ground at 195. Negative pulse 186, however, opposes positive clock pulse 150 at point 250. Therefore, neither of the control grids 256 or 261 is altered in potential and no error signal pulse 284 results. This is the desired operation, for the two input lines have received similar information.

2. The condition in which a vacant pulse space is presented to input line 131 and a negative pulse 97 is presented to input line 132. In this condition, the negative and positive pulses 186 and 187, respectively, are not generated, and the negative and positive pulses 231 and 232, respectively, are not generated. As a result, clock pulse 150 is unopposed at point 250, and proceeds to the second control grid 261 of the double triode tube 257, providing an error signal pulse 284. This is the desired operation of the circuit, for now there is lack of coincidence between the information provided in the two input lines 131 and 132.

3. A situation in which a negative pulse 97 is provided in line 131 and a vacant pulse space is presented in line 132. In this situation, negative and positive pulses 186 and 187 are generated and negative and positive pulses 231 and 232 are generated. Positive pulse 232 biases rectifier 193 to a non-conductive state with respect to positive pulse 187, and positive pulse 187 proceeds via line 235 and capacitor 255 to the first control grid 256 of the double triode 257, causing the generation of an error signal pulse 284 to warn of the lack of coincidence.

4. The situation in which a negative pulse 97 is provided at each of the input lines 131 and 132. In this situation, the negative and positive pulses 186 and 187 are not generated, while the negative and positive pulses 231 and 232 are generated. Negative pulse 231 opposes positive clock pulse 150 at point 250, as a result of which no alarm pulse is generated. This is the desired operation, for now there is coincidence of the information at the two input lines 131 and 132.

It is convenient now to review the invention as far as it has been described. The fundamental basis of binary notation is that the successive digits of a binary quantity may be said to be valued or weighted from right to left with the value $2^n$, where $n$ is the column number, starting at the right-hand end of the quantity. The conventional or decimal system value of the binary quantity is then the sum of the weights of all of those columns in which a "1" appears. In accordance with the present invention, a different value is obtained by weighting the columns in a different, arbitrarily chosen manner. Any weighting scheme different from the scheme that yields the conventional value may be used; in the example described herein, the apparatus was designed to employ the weights 1, 2, 4, 1, 2, 4, 1, 2, 4, etc. for the successive columns from right to left. A new number is then found which is the sum of the new weights of all columns in which the digit 1 occurs. This new number, or rather the lowest order four digits of it, is called the "weighted count" of the original number and is carried with it as an indicator at all times. The "modulo 16" counter described in Figs. 1–4, and more particularly in Fig. 3, provides the weighted count. To prevent the number and its count from ever being both zero simultaneously, the digit "1" is added to the weighted count in the first column. Thus, a complete failure in transmission of a number and its count will be detected. In the case of a computing machine, each number stored in the memory has its weighted count stored with it (Fig. 5), and the complete loss of both in storage is similarly detected. A number is checked at any time, particularly during a transfer from one place to another by formulating a new weighted count and checking this for identity with the weighted count carried with the number (Figs. 6 and 7).

The monitoring system of the invention is not limited to the weighting scheme 1, 2, 4, 1, 2, 4, etc.; in fact, any arbitrary weights could be assigned to the columns. For example, the columns of the binary quantity may be weighted 1, 1, 1, 1, etc. Here the summation consists merely of adding up the number of 1's which appear in the quantity. This scheme of weighting and counting does not constitute as good a check as the 1, 2, 4 scheme described above since a loss of a "1" in a given column can be compensated for by the gain of a "1" in any other column which originally held a zero, whereas, in the 1, 2, 4 scheme, a very odd combination of circumstances is needed to render the number incorrect and at the same time render a newly generated weighted count correct. For example, suppose the binary quantity were to lose four 1's in columns 3, 6, 9 and 12. Under these extraordinary circumstances the weighted count would not change and yet the number would be incorrect. The possibility of such an occurrence is very remote, however, and, therefore, the identity check afforded by the system illustrated is of a high degree of validity.

The use of modulo addition provides an indicator which has a fixed small number of columns, and can therefore be carried with the original binary quantity with small additional cost in time and equipment. However, if desired, the weighted count might be taken without modulo, or with a modulo other than 16. In a very simple system employing modulo, the sum with the columns of the original binary quantity all weighted, "1" may be added in a modulo 2 counter. Such a counter needs only one flip-flop, in which case its indication is either "1" or "0," depending upon whether the number of 1's in the original binary quantity is odd or even, or vice versa. The accuracy of such a simple system is, however, much less than that of the system described herein.

The foregoing features of the invention provide numerous advantages of economy, reliability, speed and diagnostic ability. Economy is had because it is no longer necessary or desirable to provide two identical equipments operated simultaneously with the same number information to check the identity of the information. Reliability results from the high probability that the apparatus in accordance with the invention will unfailingly detect an error. Speed is had because the checking apparatus operates practically simultaneously with the main number handling apparatus and saves great amounts of time heretofore spent in locating faults which caused errors. The diagnostic ability of the invention is a great advantage, for it contributes to speed and reliability by locating the situs of a failure as well as informing of the failure. As a word is checked as it is transferred from location to location, an error in its composition is made immediately evident, without waiting for an entire sequence of information items to be ruined, or, in the case of a computer, for an entire problem to be incorrectly solved and therefore necessary to repeat. An error is detected at the point in a problem where it occurs, and the problem can be resumed from this point when the cause of the error is removed. In prior checking systems for digital computers, for example, the existence of a time lag between an error and its detection makes it difficult to determine the exact point in the computing routine at which failure occurred, and, consequently, increases the difficulty of resuming operation. The same fault lies with prior digital telemetering systems in general. It is even possible in prior systems that intermittent errors might escape detection altogether. Particularly in the case of a computer, it is difficult and sometimes impossible to construct a test problem which completely checks the machine, that is, one which tests all storage positions and/or all control circuits.

*Supervising the accuracy of mathematical operations*

Not only is the present invention valuable for identity monitoring, but it can also be used to supervise or check the basic arithmetic processes, by means of the weighted count. Such checks are possible because the sum (or difference, product, or quotient) of the weighted counts of two numbers has a known relation to the weighted count of the sum (or difference, product, or quotient) of the numbers themselves.

An arbitrary scheme for checking binary number additions with weighted counts is set forth as follows:
Weight each column as follows:

Column:        10  9  8  7  6   5  4  3  2  1
Weighted count: 16  8  4  2  1  16  8  4  2  1

Take the total weighted summation of the columns bearing 1's without modification (that is, without modulo) to obtain the count of a number, and express the count in the binary notation. With this scheme of weighting, the formula that is used is:

$$[|(u_c+v_c)-(u+v)_c|+31]_c = 1\ 1\ 1\ 1\ 1$$

Relation (1)

where $u$ and $v$ are the numbers to be added, $u_c$ is the weighted count of $u$, and $v_c$ is the weighted count of $v$.

An example of an addition checked in accordance with this system is as follows:

Let:

$$u = 0.\ 0\ 1\ 1\ 0\ 1\ 1\ 0\ 0\ 1 = 441$$
$$v = 0.\ 0\ 1\ 0\ 1\ 0\ 1\ 0\ 0\ 1\ 1 = 339$$

Then:

$$u+v = 0.\ 1\ 1\ 0\ 0\ 0\ 0\ 1\ 1\ 0\ 0 = 780$$

The weighted counts are as follows:

$$u_c = 38 = \quad 1\ 0\ 0\ 1\ 1\ 0$$
$$v_c = 29 = \quad 0\ 1\ 1\ 1\ 0\ 1$$
$$u_c + v_c = 67 = 1\ 0\ 0\ 0\ 0\ 1\ 1$$

The weighted count of $(u+v)$ is:

$$(u+v)_c = 36 = 1\ 0\ 0\ 1\ 0\ 0$$

Then:

$$u_c + v_c - (u+v)_c = 31 = 1\ 1\ 1\ 1\ 1$$

Relation (2)

Now add binary 31 to the absolute value of Relation 2:

$$|u_c+v_c-(u+v)_c|+31 = 62 = 1\ 1\ 1\ 1\ 1\ 0$$

Relation (3)

Take the weighted count of Relation 3:

$$[|u_c+v_c-(u+v)_c|+31]_c = 31 = 1\ 1\ 1\ 1\ 1$$

Relation (1)

Relation 1 can be shown to be true for any binary addition, and, therefore, it may be used as a check that the binary addition was performed properly.

It might seem from the foregoing that the step of adding 31 (Relation 3) is superfluous, but there is the possibility that $u_c+v_c = (u+v)_c$, in which case the difference in Relation 2 would be 0 instead of five 1's. This happens, for example, when $u$ or $v$ is 32, for which the binary number is 1 0 0 0 0 0 and the count is 1, as shown in the following example where $u=32$ and $v$ is arbitrarily chosen as 91:

$$u = 32 = \quad 1\ 0\ 0\ 0\ 0\ 0$$
$$v = 91 = 1\ 0\ 1\ 1\ 0\ 1\ 1$$
$$u+v = 123 = 1\ 1\ 1\ 1\ 0\ 1\ 1$$

Then:

$$u_c = 1 = 0\ 0\ 0\ 0\ 1$$
$$v_c = 29 = 1\ 1\ 1\ 0\ 1$$
$$(u_c+v_c) = 30 = 1\ 1\ 1\ 1\ 0$$

And:

$$(u+v)_c = 30 = 1\ 1\ 1\ 1\ 0$$

So that:

$$(u_c+v_c) - (u+v)_c = 0\ 0\ 0\ 0\ 0$$

In accordance with Relation 1, add 31:

$$|(u_c+v_c) - (u+v)_c| + 31 = 1\ 1\ 1\ 1\ 1$$

Whence:

$$[|(u_c+v_c) - (u+v)_c| + 31]_c = 1\ 1\ 1\ 1\ 1$$

This scheme guarantees that the check will always be a series of five 1's in succession if the addition was performed correctly.

Multiplication is checked in accordance with formula:

$$[|(u_c \cdot v_c)_c - (u \cdot v)_c| + 31]_c = 31 = 1\ 1\ 1\ 1\ 1 \quad \text{Relation (4)}$$

Division is checked by the formula:

$$[|(u_c \cdot Q_c)_c + R_c - v_c| + 31]_c = 31 = 1\ 1\ 1\ 1\ 1 \quad \text{Relation (5)}$$

Where:

$u$ = divisor,
$v$ = dividend,
$Q$ = quotient, and
$R$ = complete remainder.

Subtraction is commonly performed as a special form of addition, employing, however, the following variation of Relation 1:

$$[|u_c - v_c - (u-v)_c| + 31]_c = 1\ 1\ 1\ 1\ 1$$

Figure 8:
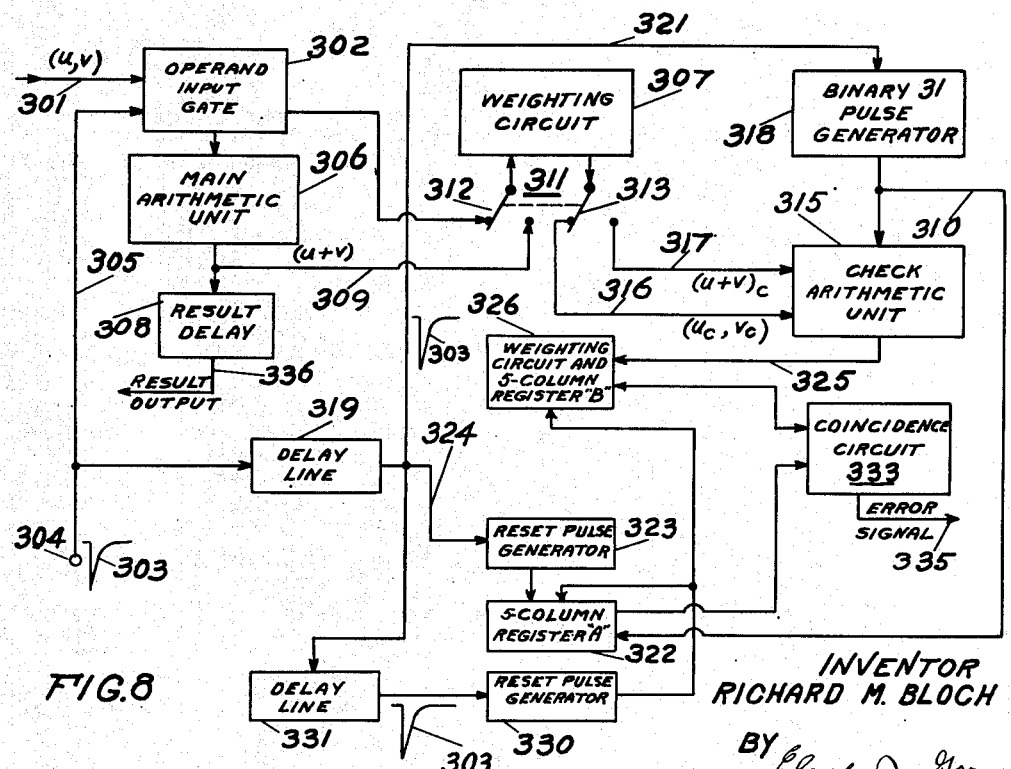
Fig. 8 is a block diagram of a system which supervises the correct performance of an arithmetic operation upon two binary quantities.

Referring now to Fig. 8, the system there shown checks the accuracy of an arithmetic operation in accordance with the foregoing considerations. The operands, $u$ and $v$, are introduced by way of input line 301 and an operand input gate 302. The gate is controlled by a clock pulse 303, which is introduced by way of a terminal 304 and a suitable line 305. The gate is of a type which is normally closed and, when triggered open, remains open for a suitable period of time to pass both $u$ and $v$ to a main arithmetic unit 306 and to a weighting circuit 307. The main arithmetic unit 306 is a component of the computing system and performs the desired operation upon $u$ and $v$. Assuming that the desired operation is one of addition, the sum $(u+v)$ is furnished by the main arithmetic unit to a result delay circuit 308, the purpose of which will be explained below, and to a result line 309, which may be connected via a switch 311 to the input of the weighting circuit 307. The weighting circuit 307 is similar in many respects to that of Fig. 1, and will be described more fully below. The switch 311 has an input blade 312 and an output blade 313 ganged together, of which the former, in one position, admits $u$ and $v$ individually to the weighting circuit from the operand input gate 302, and in the other position admits the result $(u+v)$ to the input of the weighting circuit 307 from line 309. The output blade 313, in said one position, furnishes $u_c$ and $v_c$ individually to a check arithmetic unit 315 by way of a suitable line 316, and, in the other position, furnishes $(u+v)_c$ to the check arithmetic unit by way of a second suitable line 317. The switch 311 is symbolic of any suitable gate circuit arrangement. An alternative arrangement is described below in connection with Fig. 8A.

The check arithmetic unit 315 performs the simple mathematical operation set forth in Relation 1. The step of adding binary 31 is accomplished by furnishing the proper pulse sequence to the check arithmetic unit from a binary 31 pulse generator 318. The binary 31 pulse generator is a circuit which, when set into operation, furnishes five pulses of the proper polarity, proper pulse repetition frequency, and proper interpulse spacing for use in the check arithmetic unit 315. The binary 31 pulse generator 318 is triggered into operation by the clock pulse 303 which is furnished thereto through a suitable delay line 319 and thence via a suitable connection line 321 from the delay line to the pulse generator. Preferably the delay line 319 sufficiently delays the clock pulse 303 so that the operands $u$ and $v$ can be weighted in the weighting circuit 307, and operated upon in the main arithmetic unit 306, and the weighted counts of the operands and their sum furnished to the check arithmetic unit 315 prior to the binary number 31 pulses being introduced into the check arithmetic unit.

The binary 31 pulse generator 318 is connected at its output also via a suitable line 310 to the input of a five-column register 322, termed register A, which is similar in all essential respects to the register 110 shown in Fig. 6, except that it has five columns instead of four. A reset pulse generator 323 generates reset pulses which enable register A to accept the five pulses furnished by the binary 31 pulse generator 318. The reset pulse generator 323 is triggered into operation by the same delayed clock pulse 303 which triggers the binary 31 pulse generator 318 into operation, being connected via an input line 324 to the output of delay line 319 in parallel with line 321. The reset pulse generator 323 is constructed to furnish four properly spaced reset pulses to register A, of which the first reset pulse occurs after the first, extreme right hand, binary 31 pulse has been applied to the fifth column of the register and before the second binary 31 pulse arrives, so that the reset pulses and the binary 31 pulses applied to the register are alternated with each other. In this manner, binary 31 is stored in register A at the same time that it is introduced into the check arithmetic unit 315.

The output line 325 from the check arithmetic unit 315 is connected to the input of a second weighting circuit 326 which is similar in many respects to weighting circuit 307, and includes a five-column register B. The sum $$(u_c+v_c) - (u+v)_c + 31$$

is weighted in weighting circuit 326 and the weighted count thereof then stands in register B. In this manner, the weighted count of the result from the check arithmetic unit 315 is caused to stand in register B, while binary 31 stands in register A.

The binary quantities standing in registers A and B are compared in a coincidence circuit 333 which is identical in all respects to the coincidence circuit 133 of Fig. 6, and, accordingly, may be constructed in accordance with Fig. 7. A second reset pulse generator 330 furnishes reset pulses to both registers simultaneously when set into operation by the delayed clock pulse 303 from delay line 319 via a second delay line 331. The reset pulse generator 330 is constructed to furnish five reset pulses when it is set into operation, in order that it may remove all five binary 31 pulses from the registers A and B and leave the registers clear. The coincidence circuit 333 will furnish an error signal via an output line 335 if the output from the check arithmetic unit 315 is not binary 31. The result delay 308 delays the furnishing of the result from the main arithmetic unit 306 to the result output line 336 a sufficient length of time for the coincidence circuit 333 to examine the output of the check arithmetic unit 315 and determine whether or not there is an error. If there is no error, the result $(u+v)$ will eventually be furnished to the result output line 336.

The system of Fig. 8 may be modified as shown in Fig. 8A. There the switch 311 is omitted and line 309 is connected to the input of weighting circuit 307 through a delay line 309'. This arrangement provides $(u+v)$ to the weighting circuit after $u$ and $v$ individually have been weighted. Only one output line 316 is needed, and, accordingly, output line 317 has also been omitted. In other respects, the system of Fig. 8A is like that of Fig. 8.

For checking a multiplication in accordance with Relation 4, the system of Fig. 8 is modified as shown in Fig. 8B. The operands $u$ and $v$ are applied again directly to weighting circuit 307 and to the main arithmetic unit 306, which is now a multiplier. The weighted operands $u_c$ and $v_c$ are applied to the input of an auxiliary multiplying unit 329 by way of a suitable switch 327. Unit 329 passes the product $(u_c \cdot v_c)$ to weighting circuit 307 via line 328. The product $(u \cdot v)$ is provided to the result delay 308 and line 309 in parallel. Since $u_c$ and $v_c$ are shorter than $u$ and $v$, $(u_c \cdot v_c)$ arrives at weighting circuit 307 before $(u \cdot v)$. The products $(u \cdot v)$ and $(u_c \cdot v_c)$ are thus provided sequentially to the weighting circuit 307 which weights each of them. The switch 327 then passes the weighted products $(u \cdot v)_c$ and $(u_c \cdot v_c)_c$ to line 316. The operation of the system of Fig. 8B is otherwise like that of Fig. 8. The information in line 316 is summed with binary 31 in accordance with Relation 4 in the check arithmetic unit 315, and the checking process described above is repeated.

For checking a division in accordance with Relation 5, the system of Fig. 8 is modified as shown in Fig. 8C. The operands $u$ and $v$ are applied again directly to the main arithmetic unit 306 which provides the quotient Q to the result delay 308 and the remainder R in a separate output line. The operands are also applied directly to a gate 328, which separates $u$ and $v$ and provides the former directly to the weighting circuit 307, and the latter to the weighting circuit via a first delay line 336. The remainder R is applied to the weighting circuit via a second delay line 337 of shorter delay than that of delay line 336, and the quotient Q is applied to the weighting circuit via a third delay line 338 of still shorter delay. With this arrangement, $u$, Q, R, and $v$ are applied sequentially to the weighting circuit 307, and sequentially weighted in that order.

The weighting circuit 307 is connected at its output to a gate 327 which separates $u_c$ and $Q_c$ and furnishes them to the input of a multiplying unit 329. The multiplying unit 329 furnishes the product $(u_c \cdot Q_c)$ to the input of the weighting circuit 307 via a fourth delay line 339 of longer delay than delay line 336. Thus, the weighting circuit furnishes also the weighted count of the product $(u_c \cdot Q_c)_c$. The gate 327 applies the weighted counts $R_c \cdot v_c$, and $(u_c \cdot Q_c)_c$ to the check arithmetic unit 315, which sums them with binary 31 in accordance with Relation 5. Thereafter the checking operation of Fig. 8C is the same as that of Fig. 8.

Referring now to Fig. 9, the weighting circuit 307 is there shown in detail. The circuit of Fig. 9 is similar in many respects to the circuit shown in Fig. 1, and similar parts bear similar reference characters. It differs, however, in that, since the weighting system set forth in the foregoing discussion of arithmetic checking has been chosen in accordance with the scheme 1, 2, 4, 8, 16, 1, 2, 4, 8, 16, etc., it is necessary to weight five columns rather than three. Accordingly, a different pulse generator 340, which generates pulses at one-fifth the binary pulse repetition frequency is employed, together with two additional weighting gates 341 and 342, of which the former gate is #4 and the latter is gate #5 and two additional delay lines 343 and 344. Weighting gate #4 is applied to the input of the column 4 flip-flop 24. Additional column flip-flops 345, 346 - - - are included for columns 5, 6, up to column N. These additional column flip-flops and circuits, similar to those of the other columns, are included for the reason that the weighting circuit 307 used in arithmetic checking is not a modulo counter, but, as is stated above, weights the quantities $u$, $v$, and their various results without in any way changing the weighted value, which is used unchanged in the various relations set forth. Weighting gate #5 is applied to the input of the column 5 flip-flop 345. The remaining columns 6 to N merely add binary fashion. In all other respects, the circuit of Fig. 9 operates in exactly the same fashion as the circuit of Fig. 1.

*Supervising conversions between the binary and decimal forms of notation*

For various reasons, it is convenient, in digital computing systems employing the binary form of notation, to represent all quantities as fractions consisting of a point, called the binary point, and equivalent to the decimal point in the decimal system, followed to the right-hand side thereof by binary digits, that is, 1's and zeros. The conversion of a decimal number to a binary number or a binary number to a decimal number under these circumstances is complex for the reason that, while decimal 1 and binary 1 are identical, 0.5 in the decimal system is the same as 0.1 in the binary system, 0.25 in the decimal system is the same as 0.01 in the binary system, and 0.125 in the decimal system is the same as 0.001 in the binary system. On the other hand, whole numbers are easily converted for the reason that the binary columns represent powers of 2 starting with $2^0$ in the extreme right-hand column, $2^1$ for the first column to the left, $2^2$ for the second column to the left, $2^3$ for the third column to the left, etc.

Consider now the binary fraction:

$$B = 0.1\ 0\ 1\ 1\ 0\ 1\ 1\ 1\ 0\ 0\ 1\ 1$$

This fraction can be converted to a decimal system equivalent by a process which includes successive multiplications by binary 1 0 1 0, which is decimal 10. Thus, a first multiplication by binary 10 is:

$$10B = 1\ 1\ 1.0\ 0\ 1\ 0\ 0\ 1\ 1\ 1\ 1\ 1\ 1$$

The integral part of this result, namely, 1 1 1, is the same as 7 in the decimal system. Multiply the fractional part of the foregoing binary product again by 1 0 1 0. This yields:

$$1.1\ 0\ 0\ 0\ 1\ 1\ 1\ 0\ 1\ 1$$

The integral part of this is equivalent to 1 in the decimal system. Successive multiplications in this manner by 1 0 1 0 of the fractional part of a previous product yield 1 0 1, 1 0 1, and 1 1 1 as further integral parts, which are 5, 5, and 7 in the decimal system. The binary fraction remainder, R, after the fifth such multiplication is 0. 1 0 0 1 1 1 1. The decimal equivalent of B is:

$$D = 0.71557$$

which is found by arranging the integral parts of the successive multiplications set forth above after the decimal point in the order in which they were received.

From the foregoing, it will be appreciated that conversions of fractions from the binary to the decimal system involve a complex process in which it is relatively easy to make a mistake. The present invention can be applied to the supervision of such conversions in the following manner:

1. The binary fraction B is weighted as follows, proceeding to the right from the binary point:

$$\begin{array}{c} B=0.\ 1\ 0\ 1\ 1\ 0\ 1\ 1\ 0\ 0\ 1\ 1 \\ \text{Weights}=\ \ 4\ 2\ 1\ 5\ 7\ 8\ 4\ 2\ 1\ 5\ 7\ 8 \end{array}$$

From this it is apparent that the weighted count of the binary number $B_c = 39$.

2. The binary fraction remainder R is weighted as follows, proceeding to the right from the binary point:

$$\begin{array}{c} R=0.\ 1\ 0\ 0\ 1\ 1\ 1\ 1 \\ \text{Weights}=\ \ 5\ 7\ 8\ 4\ 2\ 1\ 5 \end{array}$$

From this it is apparent that the weighted count of the binary fraction remainder $R_c = 17$. It should be noted that the weighting of the remainder and the weighting of the original binary fraction are not the same, although they are related to each other.

3. Take the sum of the digits in the decimal conversion, 0.71557, which is:

$$S = 25$$

4. Take the sum:

$$B_c + R_c + S = X \qquad \text{Relation (6)}$$

In the present instance, Relation 6 yields 81, which is an integral multiple of 9. It can be shown that the result of Relation 6 will always be an integral multiple of 9 when the present system of weighting is followed. This relation may be expressed in another, more convenient, manner as follows:

$$B_c + R_c + S_D \equiv 0 \text{ (Modulo 9)}$$
$$\text{Relation (7)}$$

Relation 7 can be verified in a modulo 9 counter of the kind shown in Fig. 10, to be described below. For use in this counter, B and R are introduced into the counter in the binary form shown above, and D is expressed in the binary-coded-decimal representation. In this representation, each decimal digit of D is expressed as a true four-column binary number, of which the columnar weights are 8, 4, 2, and 1, and the value of each decimal digit of D is:

| Decimal digit | : | 7 | 1 | 5 | 5 | 7 |
|---|---|---|---|---|---|---|
| Binary coded decimal equivalent | : | 0111 | 0001 | 0101 | 0101 | 0111 |

To introduce $S_D$ into the modulo 9 counter of Fig. 10, each of these decimal digits of D is introduced in its true binary form, with the four columns of each binary number weighted with their normal values, as set forth immediately above.

A similar relationship exists in the case of decimal-to-binary conversion of fractions.

Consider the following five-column decimal number as an example:

$$D = 0.64572$$

Obtain the binary equivalent of D to any desired accuracy by means of successive decimal doublings. Thus, beginning with D:

$$2D = 1.29144$$

The 1 which was carried into the first integral column indicates that in the binary equivalent of D the first binary digit to the right of the binary point is 1. Before proceeding to the next doubling, however, the integral part of 2D is discarded. The next doubling step then produces 0.58288. Since there is no carry into the integral position in this case, 0 is the second binary digit to the right of the binary point in the required equivalent. Since in this last product there is no integral part to be discarded, proceed straightway to the next doubling. Proceeding in this way, obtain after twenty-one doublings the binary equivalent of D to 21 binary places; this is shown in the following table:

TABLE 1

| Binary Digit | D = 0.64572 |
|---|---|
| 1 | .29144 |
| 0 | .58288 |
| 1 | .16576 |
| 0 | .33152 |
| 0 | .66304 |
| 1 | .32608 |
| 0 | .65216 |
| 1 | .30432 |
| 0 | .60864 |
| 1 | .21728 |
| 0 | .43456 |
| 0 | .86912 |
| 1 | .73824 |
| 1 | .47648 |
| 0 | .95296 |
| 1 | .90592 |
| 1 | .81184 |
| 1 | .62368 |
| 1 | .24736 |
| 0 | .49472 |
| 0 | .98944 |

Thus, where B is the binary equivalent of D:

$$B = 0.101001\ \ 010100\ \ 110111\ \ 100$$

The decimal fraction obtained as the result of the final doubling will be denoted by the symbol R; thus, in this case $$R = 0.98944$$

To check that the 21 digit equivalent is correct, weight the columns of B as follows:

$$\begin{array}{c} B = 0.101001\ \ 010100\ \ 110111\ \ 100 \\ \text{Weight:}\ \ 421578\ \ 421578\ \ 421578\ \ 421 \end{array}$$

If $B_c$ represents the weighted count of B, then $B_c = 50$. Furthermore, if $S_D$ is the sum of the decimal digits of D, and $R_{c_3}$ (the significance of the subscript 3 will be explained below) is the sum of the decimal digits of R, then:

$$D_c = 24$$

and $$R_{c_3} = 34$$

Thus, $$S_D + B_c + R_{c_3} = 24 + 50 + 34 = 108 \equiv 0 \text{ (Modulo 9)}$$
$$\text{Relation (8)}$$

This relationship is the same as Relation 7. The relationship $$S_D + B_c + R_{c_3} \equiv 0 \text{ (Modulo 9)}$$

in the case of a 21 digit value of B, can be shown to hold for the conversion of any decimal fraction D to a binary fraction B.

Again, if each decimal digit of R is represented as a true four-column binary number (that is, in the binary-coded-decimal representation), the columnar weights are then:

| Column | 4 | 3 | 2 | 1 |
|---|---|---|---|---|
| Weight ($c_3$) | 8 | 4 | 2 | 1 | and the value $R=0.98944$ would appear as:

| .9 | 8 | 9 | 4 | 4 |
|---|---|---|---|---|
| 1001 | 1000 | 1001 | 0100 | 0100 | in this new notation. In this way, the sequence of decimal digits in R is again considered as a sequence of appropriately weighted binary digits. The same arrangement of weights suffices for the weighting of the original decimal number D.

The Modulo Nine Counter shown in Fig. 10 may then be used directly to check Relation 8, for decimal to binary conversions.

The significance of the subscript 3 in $Rc_3$ remains to be explained. Actually, substantially the same checking relationship holds regardless of the number of binary digits obtained in the binary equivalent B; however, the weights assigned to the binary-coded digits of R may undergo a permutation. For example, suppose it is desired to apply the check when B is obtained to a precision of 18 digits. Referring to Table I giving the successive doublings of D, R has the following value at the completion of the 18th doubling:

$$R=0.62368$$

The sequence of digits representing R column-by-column in the binary-coded decimal system is:

$$R=0110\ 0010\ 0011\ 0110\ 1000$$

This representation is maintained, but the four binary digits of each column are now reweighted as follows:

| Column | 4 | 3 | 2 | 1 |
|---|---|---|---|---|
| Weight ($c_0$) | 1 | 5 | 7 | 8 |

Utilizing this weighting assignment, obtain the total weight count of R as:

$$Rc_0 = 12+7+15+12+1 = 47$$

Applying Relation 8, obtain:

$$S_D + Bc + Rc_0 = 24 + 46 + 47 = 117$$

where the weighting of B has extended through 18 columns instead of 21 as previously. We thus have:

$$S_D + Bc + Rc_0 = 117 \equiv 0 \quad (\text{Modulo } 9)$$

It is to be noted that the number of binary digits of B affects only the method of weighting the binary-coded decimal digits of the remainder R. It can be shown that the weighting arrangement to be used for R has a certain relationship to the number, $n$, of binary digits required in B. Let:

$$n = 6p + k \quad \text{Relation (9)}$$

where $p$ is integral and non-negative; and $0 \leq k \leq 5$. Then the weighting of each decimal column of R (where the binary digits of R are determined in accordance with the binary-coded decimal system) depends upon the value of $k$, and is performed as shown in the following table:

TABLE II

| $k$ | Column— | | | |
|---|---|---|---|---|
| | 4 | 3 | 2 | 1 |
| 0 | 1 | 5 | 7 | 8 |
| 1 | 5 | 7 | 8 | 4 |
| 2 | 7 | 8 | 4 | 2 |
| 3 | 8 | 4 | 2 | 1 |
| 4 | 4 | 2 | 1 | 5 |
| 5 | 2 | 1 | 5 | 7 |

It is to be noted that, in the case $k=3$, the weighting of R is identical with the normal values of the binary columns, and, in this case, therefore, the weighted count of R is equivalent to the sum of the decimal digits of R.

Thus, to check the $n$-digit binary equivalent of D, the following formula is used:

$$S_D + Bc + Rc_k \equiv 0 \quad (\text{Modulo } 9)$$
$$\text{Relation (10)}$$

where $k$ is defined as in Relation 9, and $c_k$ is defined by Table II.

Regardless of the number of binary digits to which B is required, the operations of Relation 10 may conveniently be executed by the Modulo Nine Counter shown in Fig. 10. As in the case of a binary-to-decimal conversion, the inputs to the counter are always seen to be a serial sequence of the weighting numbers 1, 2, 4, 8, 7, and 5 taken in the appropriate combination and order as discussed above. If the final counter reading is zero, the check of the conversion has been successfully passed.

The modulo 9 counter shown in Fig. 10 includes a control flip-flop 350, column 1, 2, 3 and 4 flip-flops, 351, 352, 353 and 354, respectively, and a carry flip-flop 355. The input to each of the column flip-flops is by way of a connection 356, 357, 358 and 359, respectively, at the bottom. In each connection 356 to 359, inclusive, there is a delay line 361, 362, 363 and 364, respectively, having a delay of a magnitude to be discussed below. There are six pulse weighting input lines 365, 366, 367, 368, 369 and 370, for weighting pulses with the relative values 5, 7, 1, 2, 4, and 8, respectively. Each input line has an isolating rectifier 371 in it, poled to pass negative pulses. Input line 367, which weights pulses with a value of 1, is connected directly to delay line 361, and therethrough to the column 1 flip-flop 351. Input line 368, which weights pulses with a value of 2, is connected directly to delay line 362, and therethrough to the column 2 flip-flop 352. Input line 369, which weights pulses with a value of 4, is connected directly to delay line 363, and therethrough to the column 3 flip-flop 353. Input line 370, which weights pulses with a value of 8, is connected directly to delay line 364, and therethrough to the column 4 flip-flop 354. Input line 365, which weights pulses with a value of 5, is connected to input line 369 via an isolating rectifier 372 and through a delay line 373 and an isolating rectifier 374 to input line 367 in parallel. The isolating rectifiers 372 and 374 are poled to pass negative pulses. As a result, a pulse on input line 365 is provided first to line 369, where it is given a value of 4, and then to line 367, where it is given an additional value of 1, to make a total value of 5. Input line 366 is connected by way of an isolating rectifier 375 to input line 369, by way of a delay line 376 and a second isolating rectifier 377 to input line 368 in parallel, and, in parallel with the connection to the line 368 following delay line 376, through a second delay line 378 and a third isolating rectifier 379 to input line 367, with the result that a pulse introduced along input line 366 is first given a weight of 4, then an additional weight 2, and then an additional weight of 1, making a total weight of 7. The isolating rectifiers 375, 377, and 379 are also poled to pass negative pulses.

A control pulse generator 381 generates positive control pulses 382 which occur at the same repetition frequency as the pulses of the quantities B, R, and D, which are introduced into the counter, but alternating therewith, as shown in Fig. 11. Fig. 11 shows one input pulse on each of the input lines 365 to 370, inclusive, the input pulses being denominated 384, 383, 385, 386, 387 and 388, respectively, arranged in the sequence in which they arrive at the counter for weighting. The frequency of repetition of the input pulses 383 to 388, inclusive, may be, for example, 100,000 per second, the pulse widths 1 microsecond and the pulse spacing approximately 10 microseconds. A control pulse 382 occurs about midway in the interval between two successive input pulses, for example, 385 and 386, or 386 and 387. The delay produced by any one of delay lines 361, 362, 363, 364 and 399 is a first time interval, which is termed 1D, and which is preferably only slightly longer than the duration of a signal or control pulse 382 to 388, inclusive, and preferably about one-eighth to one-tenth of the interval between successive control or signal pulses. The delay produced in any one of delay lines 373, 376 or 378 is twice as long as D, and is termed 2D.

Referring again to Fig. 10, the control pulse 382 is provided in parallel to a first control pulse gate 391, a second control pulse gate 392, and via line 521 and a phase inverter 522 to a delay line 393. The phase inverter furnishes a negative pulse 397 to the delay line 393 in response to the positive control pulse. The control pulse gates 391 and 392 are normally closed in the sense that they do not pass the control pulse 382. A third, also normally closed control pulse gate 394 is in series with the second control pulse gate 392 as far as the control pulse 382 is concerned. The second and third control pulse gates 392 and 394 and the first control pulse gate 391 are in two parallel-connected paths 515 and 514, respectively, so that, if the control pulse passes through either the first control pulse gate 391, or the second and third control pulse gates 392 and 394 in series, it is applied to a phase inverter 380. The phase inverter 380 in response generates a negative pulse 396 which it furnishes via line 485 to the carry flip-flop 355, and to a first input 395 to the control flip-flop 350. The negative control pulse 396 causes the control flip-flop to open a fourth normally-closed control pulse gate 398 to permit the passage therethrough of the negative control pulse 397 from phase inverter 522. Upon emerging from the fourth control pulse gate 398, negative control pulse 397 passes in parallel to a delay line 399 and through an isolating rectifier 401 to an input line 402 to the counter. Input line 402 is connected to the counter in parallel with the 7-input line 366, so that pulse 397 is given the weight 7 in the counter. The rectifier 401 is poled to pass negative pulses. Delay line 399 introduces a suitable delay, never greater than the time interval between two successive control pulses 382, after which control pulse 397 proceeds via a second input line 403 to the control flip-flop 350 and operates that flip-flop to close the fourth control pulse gate 398, so that a subsequent control pulse 397 cannot pass therethrough. Suitable circuits for use as phase inverters are described below in connection with Figs. 16 and 17.

The various flip-flops in Fig. 10 are of a type which is conductive on one side or the other at all times, and undergoes a change of state each time a negative pulse is applied to its input. Details of suitable flip-flop circuits are shown in Fig. 12 to which reference is now made. In Fig. 12 the carry flip-flop 355 and the column 4 flip-flop 354 are shown in detail. The column 1, 2 and 3 flip-flops are the same as the column 4 flip-flop and are shown in block form. The control flip-flop, not shown, is substantially identical to the column flip-flops.

Referring now to the dotted line box labelled 354', this box includes the column 4 flip-flop 354 and certain output and gate circuits associated therewith which will be described. The column 4 flip-flop 354 which is shown is basically an Eccles-Jordan circuit comprising two cross-connected tubes 405 and 406. The anode 407 of tube 406 is connected via an anode resistor 408 to a B+ line 410. The anode 411 of tube 405 is connected to the B+ line via an anode resistor 412. The grid 413 of tube 406 is connected to the anode 411 of tube 405 via a resistor 414 which is shunted by a capacitor 415, and the grid 416 of tube 405 is connected to the anode 407 of tube 406 via a resistor 417 which is shunted by a capacitor 418. The cathodes 421 and 422 of tubes 405 and 406, respectively, are connected together and to ground at 423 via a resistor 424 which is shunted by a capacitor 425. The cathodes are also connected to the input line 359 via a resistor 426. The input line 359 is connected to the grids 413 and 416 via unidirectional conductors or rectifiers 428 and 429, respectively, which are poled to pass negative pulses to the grids. The grids 413 and 416 are connected to ground via resistors 431 and 432, respectively.

A direct current output is provided from the flip-flop via an amplifier stage 435, which comprises a tube 436 having a cathode 437 which is connected to cathodes 421 and 422. A grid 438 of the amplifier tube is directly connected to grid 413, and the anode 439 thereof is connected to the B+ line 410 via a suitable resistor 441. An output line 442 is connected to the anode 439 of the amplifier tube. The amplifier tube 436 duplicates the state of flip-flop tube 406, so that, when tube 406 is conductive, tube 436 is conductive, and, when tube 406 is nonconductive, tube 436 is nonconductive. In the particular modulo 9 circuit being described, the digit "1" is said to stand in the flip-flop when tube 406 is nonconductive, and output line 442 is consequently at a high voltage level, while the digit "0" is said to stand in the flip-flop when tube 406 is conductive, and output line 442 is at a low voltage level. This is, of course, a D. C. output.

Referring momentarily to Fig. 10, each column flip-flop 351, 352, 353 and 354 has associated therewith a carry gate 445, 446, 447 and 448, respectively, for a purpose to be explained below. The carry gate of each column is closed to the passage of pulses when the flip-flop of its column stands at zero, and is open to the passages of pulses when the flip-flop of its column stands at 1. Referring again to Fig. 12, the carry gate 448 of column 4 is shown in the left-hand portion of block 354'. The gate includes a pentode-type tube 451 having its cathode 452 connected to cathodes 421 and 422. The control grid 453 is connected to the grid 416 of flip-flop tube 405 via a large resistor 454 and to the cathode 452 through a capacitor 455. The screen grid 456 is connected to the B+ line 410 via a suitable resistor 457 and to ground at 459 via a bypass capacitor 458. The suppressor grid 461 is employed as an input electrode for pulses seeking to pass through the gate. Such pulses may arrive along line 370, which, as was described in connection with Fig. 10, is the input line for column 4, or along line 462 which is connected to the output of the carry gate 447 of the previous column, column 3, and are coupled to the input grid 461 via a coupling capacitor 463. Suitable operating biases for the tube 451 are provided from a source of positive potential (not shown) which may be of the order of 150 volts, via an input terminal 467 and a pair of resistors 464 and 465 connected in series between the terminal 467 and ground at 459. A third resistor 466 is connected between the junction of resistors 464 and 465 and the input grid 461. The anode 468 of tube 451 is connected to the B+ line 410 via the primary winding 469 of a transformer 471. The primary winding 469 is shunted by a rectifier 472, which is poled to pass to the anode line 410 charges which tend to drive the anode 468 negative with respect thereto. The secondary winding 473 of the transformer 471 is grounded at one end 474 and connected at the other end to an output line 475 via a capacitor 476.

The gate tube 451 is maintained in a predetermined normally conductive state by the bias potentials furnished thereto. The cathode 452 is always somewhat positive with respect to ground, due to the drop, which may be of the order of 28 volts, in resistor 424. Thus, in order to maintain the gate tube conductive, the input grid 461 is maintained at a positive potential with respect to the cathode 452, which positive potential is determined by the voltage drop in resistor 465. In addition, the screen grid 456 is maintained positive by connection with the B+ line 410 via resistor 457. The normal control grid 453 assumes the potential of grid 416 of flip-flop tube 405. When tube 405 is conductive, which occurs when a "1" stands in the flip-flop, grid 416 is at a high potential corresponding to the high level attained by anode 407 of flip-flop tube 406, so that gate tube 451 is maintained highly conductive. Under this condition the arrival of a negative pulse at the signal input grid 461 from either of lines 370 or 462 causes a corresponding substantial reduction in the current flow through the gate tube, with the result that a positive pulse 479 is produced at the anode 468. The secondary winding 473 is so connected that a negative pulse 480 is produced in the output line 475 as a result of the positive pulse 479. In this sense, the carry gate 448 is open.

When a zero stands in the flip-flop, tube 405 is nonconductive, and its grid 416 is at a relatively lower potential level, to which level it brings the control grid 453 of the gate tube 451. Under this condition, the gate tube is very close to or at cutoff, so that the arrival of a negative pulse at the signal input grid 461 causes no effective change in the current flow therethrough. In this sense, the carry gate 448 is closed.

At the time when the flip-flop 354 changes from a "1" to a "0" condition, the grid 416 of tube 405 suddenly becomes negative, the negative surge having the characteristics, for example, of a negative pulse 481. Such a pulse would suddenly cut off the gate tube 451 and create a spurious output pulse 480, if not for the fact that resistor 454 and capacitor 455 comprise together an integrating circuit which reduces the peak of voltage of pulse 481 to a value so low that there is substantially no effect upon the current flow through the gate tube 451. The time constant, RC, of resistor 454 and capacitor 455 is, however, less than the delay introduced by the delay line 364.

The dotted line box which is labelled 355' includes the carry flip-flop 355 and its output stage 483, which are similar in all essential respects to the column 4 flip-flop 354 and its output stage 435, and will accordingly be discussed in detail no further. The input line 484 to the carry flip-flop 355 is, as shown in Fig. 10, connected directly to the output line 475 of the carry gate 448 of column 4, and, in parallel therewith, to output line 485 from phase inverter 380.

Control pulse gate 391 in path 514 is open when the carry flip-flop 355 stands at "1" and closed when this flip-flop stands at "0." The control connection is via line 516 and an isolating rectifier 517 from output stage 483. Control pulse gate 392 in path 515 is open when the column 4 flip-flop 354 stands at "1" and closed when this flip-flop stands at "0." The control connection is by way of line 511 and an isolating rectifier 512 from output stage 435. Control pulse gate 394 in path 515 is open when either one of the column 1, 2 or 3 flip-flops 351, 352, 353, respectively, stands at "1," and closed when all of these flip-flops stand simultaneously at "0." The control connection is via line 502, and isolating rectifiers 507, 508 and 509 in parallel from output stages 503, 504, and 506, respectively. A detailed description of how these gates are constructed and operated appears below, in connection with Fig. 12.

Referring further to Fig. 10, the control flip-flop 350 and the control pulse gate 398 which is connected thereto are similar in all essential respects to flip-flop 354 and its carry gate 448, and are similarly connected together. The only difference is that the two tubes of the control flip-flop 350 have their grids connected to separate input lines 395 and 403, the connections being such that a negative pulse 396 is required in line 395 to put a "1" in the flip-flop, and a negative pulse 397 is required in line 403 to shift the flip-flop to zero.

The operation of the modulo 9 counter of Fig. 10 may now be explained. It will be recalled from Relations 7 and 10 that a conversion to the binary system from the decimal system, or to the decimal system from the binary system of notation, has been correctly performed when the sum of properly weighted counts of the binary and decimal equivalents and their whole remainder is an integral multiple of 9. Accordingly, the four columns of the counter of Fig. 10 are arranged so that they will count any quantity modulo 9 and will all stand at zero when the sum of the counted quantities is 9 or an integral multiple thereof. The carry flip-flop 355 is arranged so that it also will stand at zero when the quantity registered in the columns is 9 or a multiple thereof, after suitable control operation under the control of the control pulse generator 381, as will presently be explained. The fact that the column and carry flip-flops 351 to 355, inclusive, all stand at zero is indicated to an operator or to other equipment which may be associated with the modulo 9 counter by a check indicator 487, the input line 488 of which is connected in parallel to direct current output lines 491, 492, 493, 494 and 495 of the column and carry flip-flops 351 to 355, respectively. An isolating rectifier 496, 497, 498, 499 and 500 is connected in each of the flip-flop output lines 491 to 495, respectively, poled to pass positive changes in voltage from the flip-flops to the check indicator 487. The detailed construction and operation of the check indicator 487 will be explained below in connection with Fig. 12.

For the purpose of explaining how the modulo 9 counter is operated, it will now be assumed that four binary digits, to be weighted 7, 5, 2 and 4, respectively, are applied in that order to the proper input lines 366, 365, 368 and 369, respectively, of the counter, in a time-spaced sequence as is set forth in Fig. 11. The binary number .1 1 0 1 1, for example, can be so weighted. Weighting gate arrangements as shown in Figs. 1 and 9 may be employed, if desired. The columns of the number are weighted as follows:

Number: 1 1 0 1 1
Columnar weights: 4 2 1 5 7

Prior to tracing the effects of the pulses representing these digits through the counter it should be recalled that the delay produced by any one of delay lines 361, 362, 363, 364 and 399 is 1D, as defined above in connection with Fig. 11, and that the delay produced by any one of delay lines 373, 376 or 378 is twice as long, or 2D. In the discussion that follows, the first pulse 383, namely, that which has a weight of 7, is considered to enter the counter on line 366 at a time zero D and the discussion of what happens to it proceeds in terms of delay elements D.

The 7-pulse 383 enters the counter on line 366 at zero D and proceeds through rectifier 375 to line 369 and to the input of carry gate 447, column 3, and at the same time to delay line 376. Carry gate 447 is closed for the reason that flip-flop 353 stands at zero, it being assumed that the counter has zeros in all the flip-flops prior to commencing a checking operation. At time 1D the 7-pulse proceeds through delay line 363 to the column 3 flip-flop 353 and sets this flip-flop at 1. At time 2D the 7-pulse proceeds through delay line 376 and rectifier 377 to column 2 input line 368 and carry gate 446, and to delay line 378. Carry gate 446 is closed to the 7-pulse since the column 2 flip-flop 352 stands at zero. At time 3D delay line 362 passes the 7-pulse to column 2 flip-flop 352 and sets it at 1. At time 4D delay line 378 passes the 7-pulse through rectifier 379 to delay line 361 and carry gate 445 of column 1. Carry gate 445 is closed to the 7-pulse since column 1 flip-flop 351 stands at zero. At time 5D delay line 361 passes the 7-pulse to column 1 flip-flop 351 and sets it at 1. Thus, at time 5D each of the column 1, 2, and 3 flip-flops stands at 1, so that the four-column flip-flops now register the binary number 0 1 1 1, which corresponds to 7 in the decimal system. At this time control pulse gate 394 is open, by virtue of its control connection 502 in parallel to the direct current output stages 503, 504 and 506 of the column 1, 2 and 3 flip-flops 351, 352 and 353, respectively, all of which stand at "1", but control pulse gate 392 is closed, since the column 4 flip-flop 354 stands at "0." The carry flip-flop also stands at "0" so control pulse gate 391 is also closed.

A control pulse 382 is generated approximately at time 5D, and is furnished via a line 513 to paths 514 and 515 in parallel. These two paths are closed, however, and therefore, the control pulse 382 does not pass through either of paths 514 or 515. As a consequence, the control flip-flop 350 remains at "0" and the control pulse gate 398 controlled thereby remains closed. Thus, the control pulse 382 which is generated following the introduction of the 7-pulse into the counter does not proceed into the column flip-flops.

A 5-pulse (384 in Fig. 11) now enters on the 5-line 365 at a time which can again be called zero D, since the sequence of events which follows it can be referred to this pulse with respect to time. The 5-pulse passes through rectifier 372 and is provided to the column 3 delay line 363 and the column 3 carry gate 447 in parallel. Still at zero D, the 5-pulse passes through the carry gate 447, this gate being open for the reason that the column 3 flip-flop 353 stands at 1, and arrives at the column 4 delay line 364 and carry gate 448. Gate 448 is closed, since the column 4 flip-flop 354 stands at zero. At time 1D, the 5-pulse passes through the column 3 and column 4 delay lines 363 and 364, respectively, setting the column 3 flip-flop 353 to zero and the column 4 flip-flop 354 to 1. At time 2D, the 5-pulse passes through delay line 373 and rectifier 374 to line 367, where it is furnished to the column 1 carry gate 445 and delay line 361 in parallel. The column 1 flip-flop 351 standing at 1, the 5-pulse passes through the column 1 carry gate 445 and is furnished to the column 2 delay line 362 and carry gate 446 in parallel. The column 2 flip-flop 352 standing at 1, the 5-pulse passes through the column 2 carry gate 446 and is furnished to the column 3 delay line 363 and flip-flop 447 in parallel. The column 3 flip-flop 353 now standing at zero, the 5-pulse does not pass through the column 3 carry gate 447. Thus, the 5-pulse now stands at the entrance to the column 1, 2 and 3 delay lines 361, 362 and 363, respectively. At time 3D, the 5-pulse passes through each of these delay lines to the column 1, 2 and 3 flip-flops 351, 352 and 353, respectively, setting the column 1 and 2 flip-flops 351 and 352 each to zero and the column 3 flip-flop 353 to 1. The four columns of the counter now stand at 1 1 0 0, which is binary 12, the sum of 7 and 5.

Since there is a 1 in column 4, the output 435 of the column 4 flip-flop 354 is at a high level and, through line 511, causes control pulse gate 392 to be opened. Control pulse gate 394 is also open because the column 3 flip-flop 353 also stands at 1. Thus, one of the paths, namely, path 515, through which the control pulse 382 can pass, is now open and the control pulse 382 which occurs following the 5-pulse (384 in Fig. 11) is allowed to pass, as pulse 382, to phase inverter 380 along line 519. The inverter 380 provides the negative pulse 396 to the control flip-flop 350 along line 395 and sets the control flip-flop at 1, opening the control pulse gate 398. Pulse 396 is provided also to the input line 484 of the carry flip-flop 355, via line 485 and a suitably poled unidirectional conductor 524, and thus sets the carry flip-flop 355 at 1 substantially immediately following the generation of control pulse 382. The control pulse 382 provides also the negative pulse 397 to delay line 393, and thence to control pulse gate 398.

At a time 1D with respect to the initiation of the control pulse 382, the negative control pulse 397 passes through the control pulse gate 398 and is provided in parallel to delay line 399 and rectifier 401. Still at time 1D, the negative control pulse 397 is provided to the weight 7 input line 366 of the counter, where it behaves in the same fashion as a 7-pulse. Thus, at time 1D, pulse 397 arrives at carry gate 447 and delay line 363 of column 3, passing through the gate since the column 3 flip-flop 353 stands at 1. Still at time 1D, pulse 397 arrives at carry gate 448 and delay line 364 of column 4, and passes through the gate since the column 4 flip-flop 354 stands at 1. Still substantially at time 1D, pulse 397 arrives at the input line 484 of the carry flip-flop 355 and sets that flip-flop back to zero. At time 2D, pulse 397 passes through delay lines 363, 364 and 399. The passage through delay line 399 merely sets control flip-flop 350 back to zero, closing the control pulse gate 399, which no longer need remain open. The passage through delay lines 363 and 364 sets the column 3 and column 4 flip-flops 353 and 354 to zero. At time 3D, pulse 397 passes through delay line 376 and rectifier 377 to the column 2 delay line 362 and carry gate 446 in parallel. The column 2 flip-flop 352 standing at zero, pulse 397 does not pass through the carry gate 446. At time 4D, pulse 397 passes through delay line 362 and sets the column 2 flip-flop 352 to 1. At time 5D, pulse 397 passes through delay line 378 and rectifier 379 to the column 1 delay line 361 and carry gate 445 in parallel. The column 1 flip-flop 351 standing at zero, pulse 397 does not pass through the carry gate 445. At time 6D, pulse 397 sets the column 1 flip-flop 351 to 1. The four columns of the counter now stand at 0 0 1 1, which is 3, and which is also 12, modulo 9. Since the counter is designed to count up to 8 and to express 9 as a zero and commence counting over again, it expresses 12 as 3. This counter reads zero each time the total registered in it arrives at an integral multiple of 9, as will presently appear.

The pulse having a weight of 2 arrives along line 368. This pulse corresponds to pulse 386 in Fig. 11. It will be noted at this point that a pulse space, corresponding to pulse 385 in Fig. 11, has been skipped. In the normal course of weighting, this happens when a zero is present in the binary number in the pulse space that is skipped. However, the control pulses 382 continue regularly. These have no detrimental effect, however, for a second control pulse 382 following a blank signal pulse space does not operate upon the circuit. Unless the quantity in the counter is greater than 8, or binary 1 0 0 0, neither of paths 514 or 515 is open. However, if, after a signal pulse has been inserted, this quantity is greater than 8, the next control pulse 382 which follows the insertion of the signal pulse causes the counter to change to the modulo 9 representation of the quantity. In the example just given, the counter changed from 1 1 0 0 to 0 0 1 1, or from 12 to 3. Therefore, a second control pulse 382, following a blank binary number space, is ineffective upon the counter circuit.

The 2-pulse 386 is provided to the column 2 delay line 362 and carry gate 446 in parallel and, since the column 2 flip-flop 352 stands at 1, passes through the gate 446 to the column 3 delay line 363 and carry gate 447 in parallel. The column 3 flip-flop 353 stands at zero, however, and the gate 447 thereof is closed. At time 1D with respect to the 2-pulse, the 2-pulse passes through delay lines 362 and 363 and changes the column 2 flip-flop 352 from 1 to zero, and the column 3 flip-flop 353 from zero to 1. The columns of the counter now stand at 0 1 0 1, which is binary 5, the sum of 3 and 2. Neither of the two paths 514 or 515 for the next succeeding control pulse 382 is open so that the next succeeding control pulse 382 has no effect upon the circuit and need be discussed no further.

A pulse having the weight 4 enters along line 369. This pulse corresponds to pulse 387 in Fig. 11. The 4-pulse passes immediately to the column 3 delay line 363 and carry gate 447 in parallel. The gate 447 is open, since the column 3 flip-flop 353 stands at 1, so that the 4-pulse passes through it to the column 4 delay line 364 and carry gate 448 in parallel. Since the column 4 flip-flop 354 stands at zero, gate 448 is closed. At time 1D with respect to the entrance of the 4-pulse, the 4-pulse passes through delay lines 363 and 364 setting the column 3 flip-flop 353 from 1 to zero and the column 4 flip-flop 354 from zero to 1. The four columns of the counter now stand at 1 0 0 1, which is binary 9, the sum of the decimal digits 7, 5, 2 and 4.

With the column 4 and column 1 flip-flops 354 and 351, respectively, standing at 1, path 515 for the next succeeding control pulse 382 is open, and, as has been explained above, a negative pulse 396 is provided from inverter 380 which changes the carry flip-flop 355 and the control flip-flop 350 each from zero to 1. At time 1D with respect to the initiation of the control pulse 382, the corresponding negative pulse 397 passes through the control pulse gate 398 and again is impressed upon the 7-pulse input line 366 and delay line 399 in parallel. Still at time 1D, control negative pulse 397 arrives at delay line 363 and carry gate 447 of column 3. The column 3 flip-flop 353 standing at zero, gate 447 is closed. At time 2D, pulse 397 passes through delay line 363 and sets the column 3 flip-flop 353 at 1, and passes also through delay line 399 to reset the control flip-flop 350 to zero and close the control pulse gate 398. At time 3D, pulse 397 passes through delay line 376 and is impressed upon delay line 362 and carry gate 446 of column 2 in parallel. Column 2 flip-flop 352 stands at zero, and, therefore, gate 446 is closed. At time 4D, pulse 397 passes through delay line 362 to the column 2 flip-flop 352 and sets the column 2 flip-flop at 1. At time 5D, pulse 397 passes through delay line 378 and is impressed upon delay line 361 and carry gate 445 of column 1 in parallel. The flip-flops of all the columns at this moment all stand at 1 with the result that pulse 397 passes through all four carry gates 445, 446, 447 and 448 with great rapidity and appears substantially simultaneously at the inputs of the column 2, 3 and 4 delay lines 362, 363 and 364, respectively, and in the input line 484 of the carry flip-flop 355. Thus, at time 5D, the carry flip-flop 355 is reset to zero. At time 6D, pulse 397 passes through the delay lines 361 to 364, inclusive, of columns 1 to 4, respectively, and sets the flip-flops 351 to 354, respectively, all to zero. Thus, with 9 standing in the counter, that is, with the column flip-flops standing at 1 0 0 1, the next succeeding control pulse 382 resets the entire counter to zero. It is this characteristic which gives the counter its name: "Modulo 9 Counter." As will be explained below, the check indicator 487 is arranged to indicate to an operator or to succeeding circuits the fact that the column and carry flip-flops all stand at zero.

The delay time represented by the term 1D, namely, the delay provided by delay lines 361 to 364, inclusive, 393 and 399, should be long enough to permit a signal pulse to pass through all four carry gates and arrive at the carry flip-flop prior to a succeeding action being taken. This is a short time, much shorter than the width of a single signal pulse.

The foregoing example did not illustrate the use of control pulse gate 391 in path 514 for the control pulse 382. This path is provided for use when a binary number pulse having the weight 8 is introduced along line 370 at a time when the column flip-flops stand at 8, or 1 0 0 0 in the binary system. If an 8-pulse is now introduced along line 370, it passes immediately through the column 4 carry gate 448 and sets the carry flip-flop 355 to 1. At time 1D later, the 8-pulse passes through delay line 364 and sets the column 4 flip-flop 354 to zero. At this instant 1 0 0 0 0, or 16, stands in the carry and column flip-flops. Since the carry flip-flop 355 is at 1, control pulse gate 391 is open and the next succeeding control pulse 382 passes through path 514 to the inverter 389 providing the negative pulse 396 which sets the carry flip-flop 355 to zero. The negative pulse 396 also sets the control flip-flop 351 to 1 and, at a time 1D later with respect to the initiation of the control pulse 382, negative pulse 397 enters the 7 line. At this instant the entire counter stands at zero and control pulse 397 proceeds in the same manner as if a 7-pulse were added to the counter standing at zero, and, as has been already explained above, sets the column 1, 2 and 3 flip-flops each to 1. Thus, the control pulse 382 changes a reading of 16 in the counter to a reading of 7, which is 16 counted modulo 9. It is thus seen that control pulse gate 391 is employed when control pulse gates 392 and 394 are not open together and yet it is necessary to change the state of the carry flip-flop 355. This occurs when an 8-pulse is added to the counter standing at 1 0 0 0.

Referring now to Fig. 12, the check indicator 487 comprises a pentode-type electron tube 530, the cathode 531 of which is connected to ground at 532 by way of the secondary primary winding 533 of a pulse transformer 534, connecting wires 535, 536, 537 and the movable tap 538 of a potentiometer, the resistance element 539 of which is connected at one end to ground at 532 via a resistor 541. Resistor 541 is shunted with a bypass capacitor 542. The remaining end of potentiometer resistor 539 is connected to line 410 which is in turn connected to a source of B+ potential (not shown) which is brought to the circuit at a suitable terminal 543, through a voltage dropping resistor 544. The junction of potentiometer resistor 539 and B+ line 410 is grounded through a bypass capacitor 545. Resistors 544, 539 and 541 thus form a voltage divider from B+ to ground, and movable tap 538 selects a suitable voltage to be applied to the cathode 531 of the check indicator tube 530, and, as will be shown, to the cathodes of certain other tubes in Fig. 12. The anode 546 of tube 530 is connected to the B+ terminal 543 via the primary winding 547 of an anode circuit transformer 548. The primary winding 547 is shunted with a unidirectional conductor 549 poled to pass negative pulses from the anode 546 to the B+ terminal 543. The screen grid 551 of the tube is connected to the B+ terminal 543 via a second primary winding 552 of the anode circuit transformer 548. The purpose of this second primary winding will be explained below. The suppressor grid 553 is connected to the cathode in normal fashion.

A positive pulse 555 which will be termed the "final pulse" is brought into the check indicator along an input line 556 which is connected to one end of the primary winding 557 of the cathode transformer 534. The other end of this primary winding is grounded at 558. A first resistor 561 is connected at one end to the input line 556 and at the other end to the anode 562 of a diode 563. The cathode 564 of diode 563 is connected to the lower end 565 of the secondary winding 566 of the anode circuit transformer 548. The diode 563 is representative of any suitable unidirectional conductor and it is understood that other types of such conductors, for example, crystal rectifiers, may be used in place thereof. The anode 562 is also connected to an error pulse output line 567 through which a positive pulse 568, which will be termed the "error pulse," is furnished when one or more of the column and carry flip-flops stands at 1. A second resistor 571 is connected at one end to the final pulse input line 556 and at the other end to a third resistor 572 which in turn is connected at its free end to the upper end 573 of the secondary winding 566 of the anode circuit transformer 548. The center 574 of the secondary winding 566 is grounded at 575, and a fourth resistor 576 is connected from the center 574 to a lower end 565 thereof. The cathode 578 of a second diode 579 is connected to the junction 581 of the second and third resistors 571 and 572, respectively, and to this junction is also connected a check pulse output line 582. A positive pulse 583, which will be termed the "check pulse," is provided in the output line 582 in response to the introduction of a final pulse 555 when all five of the column and carry flip-flops stand at zero simultaneously. The anode 584 of the second diode 579 is grounded at 585.

The control grid 586 of the check indicator tube 530 is connected to line 488, to which, it will be recalled, are connected the output stages 503, 504, 506, 435 and 483 of columns 1 to 4, respectively, and the carry flip-flop, via unidirectional conductors 496 to 500, respectively. A bias potential is connected to the control grid 536 by way of a bias terminal 587 and a series resistor 588. Suitable bias potential is derived from the aforementioned voltage divided between B+ terminal 543 and ground at 532, through a line 590 connected to the junction of resistors 539 and 541 of the divider. The bias for the check indicator tube 530 is so set that the tube is at or slightly below cutoff when all five of the column and carry flip-flops stand at zero simultaneously and, when one or more of these flip-flops stands at 1, the bias level is raised sufficiently in a positive direction to render the tube substantially conductive. The arrangement of the cathode transformer 534 is such that when a final pulse 555, which is positive, is introduced along line 556, it renders the cathode 531 momentarily more positive. The bias arrangement is such that, if all five of the column and carry flip-flops stand at zero, a final pulse 555 introduced through the cathode transformer 534 has no effect upon the tube for the reason that the tube is already cut off, but, if any one of these flip-flops stands at 1, the tube is initially conductive and is cut off by the final pulse 555.

Assume first that one or more of the column and carry flip-flops stands at 1 when a final pulse 555 is introduced. The resultant cutting off of the tube 530 causes the production of a positive pulse 592 at the anode 546, which pulse appears in the primary winding 547 in the anode circuit transformer 548. The additional secondary winding 552 in the circuit of the screen grid 551 provides additional positive pulse voltage upon cutoff for the reason that the screen acts somewhat in the fashion of an anode. This additional secondary winding is included for this purpose and to isolate the positive pulse 592 from the B+ terminal 543, which isolation would not be as well provided by a screen circuit resistor, and also to prevent the loss of energy in the screen circuit which would result if a resistor were used. The positive pulse 592 produces a positive secondary pulse 593 at the lower end 565 of the secondary winding 566 and a negative secondary pulse 594 at the upper end 573 thereof. The positive and negative secondary pulses 593 and 594, respectively, are of the same or slightly greater magnitude than the final pulse 555. The final pulse 555 proceeds through the first resistor 561 to the anode 562 of the first diode 563. The positive secondary pulse 593 is present at the cathode 564 of the diode, however, and, being of sufficiently great magnitude, maintains this diode nonconductive in the presence of the final pulse 555. The final pulse 555, therefore, has no path to follow except along error pulse line 567 where it appears as the error pulse 568. It is preferred to provide the error pulse 568 to a circuit having an input impedance of the order of a megohm so that substantially the entire voltage of the final pulse 555 appears in the error pulse 568. The final pulse 555 follows also a second path including the second resistor 571 and junction 581. The negative secondary pulse 594 and the positive final pulse 555 arrive together at the cathode 578 of the second diode 579 with the result that, the negative secondary pulse 594 being predominant, the diode is render conductive so that junction 581 is substantially at ground potential and the magnitude of the check pulse 583 which appears in the check pulse output line 582 is insignificantly small.

In the case where all five of the column and carry flip-flops stand at zero, the check indicator tube 530 is, as has been set forth, already cut off prior to the arrival of the final pulse 555. In this case, the final pulse 555 fails to produce the positive and negative secondary pulses 593 and 594, respectively, in the anode circuit transformer 548. Thus, when the final pulse 555 passes through the first resistor 561, it finds the first diode 563 disposed to conduct it to ground at 575 through the fourth resistor 576. The first and fourth resistors are so proportioned that the magnitude of the fourth resistor 576 is a very small fraction of that of the first resistor 561. For example, the magnitude of the first resistor 561 can be 5,600 ohms and the magnitude of the fourth resistor can be 300 ohms. The magnitude of the resistance of the diode 563 when conductive is in the neighborhood of 100 ohms. Thus, the first resistor 561, the diode 563 in a conductive state, and the fourth resistor 576 comprise a voltage divider of approximately 6,000 ohms connected between the final pulse input line 556 and ground at 575. The error pulse output line 567 is connected to this voltage divider at a point, namely, anode 562, which is 400 ohms from the ground end 575. For this reason, the error pulse 568 which results is approximately four-sixtieths as great in voltage magnitude as the final pulse 555, and is consequently insignificantly small. The error pulse 555 proceeds also through a second parallel path through the second resistor 571 to junction 581 where, being positive, it cannot pass through the second diode 579. Its path through the third resistor 572 involves passage through one-half of the secondary winding 566 of the anode circuit transformer 548, which winding presents a substantially high impedance to the passage of a pulse. For this reason, the check pulse 583 which results is of substantially the same voltage magnitude as a final pulse 555. Thus, when all five of the column and carry flip-flops 351 to 355, inclusive, stand at zero, the introduction of a final pulse 555 into the check indicator 487 provides a check pulse 583 in output line 582. The second and third resistors 571 and 572 preferably have the same resistance magnitudes, which may be in the neighborhood of 5,600 ohms like the first resistor 561. The check pulse 583 is preferably furnished to a circuit having an input impedance in the neighborhood of a megohm, as in the case of the error pulse 568.

The control pulse gate 391 is arranged to be open to the passage of a control pulse 382 when the carry flip-flop 355 stands at 1. This gate includes a pentode type electron tube 601 having its control grid 602 connected to the output stage 483 of the carry flip-flop by way of line 516 and isolating rectifier 517. Bias potential is provided to the control grid 602 through a terminal 603 and a series resistor 604. The terminal 603 receives its bias potential from line 590. The cathode 605 and suppressor grid 606 of tube 601 are connected through the secondary winding 607 of a cathode transformer 608 and line 537 to the cathode bias potentiometer tap 538. The anode 609 of the tube 601 is connected to the B+ terminal 543 via the primary winding 611 of an anode circuit transformer 612, and the screen grid 613 is connected also to the B+ terminal 543 via a second primary winding 614 of the same transformer. A unidirectional conductor 615 is connected in shunt with the first primary winding 611 and poled to conduct negative pulses from the anode 609 to the B+ terminal 543. As in the case of the check indicator tube 530, the gate tube 601 is so biased that, when a "1" stands in the carry flip-flop 355, the control grid 602 is at a sufficiently high potential with relation to the cathode 605 so that the tube is conductive, and, when a zero stands in the flip-flop, the control grid is at or slightly below the cutoff potential level and the tube is nonconductive. The positive control pulse 382 is brought to one end of the primary winding 618 of the cathode transformer 608 and to a first resistor 619 in parallel. The other end of the primary winding 618 is grounded at 621 and a diode 622 is connected across the primary winding 618 with its anode 623 connected to the ground end. The diode 622 maintains the control pulse 382 positive with respect to ground by shorting to ground any portion thereof which is negative with respect to ground. The first resistor 619 is connected to the anode 625 of a second diode 626, the cathode 627 of which is connected to one end of the secondary winding 628 of the anode circuit transformer 612. The other end of this secondary winding 628 is connected to ground at 629. A second resistor 631 is connected across the secondary winding 628. The junction of the anode 625 of the second diode 626 and of the resistor 619 is connected via a large coupling capacitor 632 to path 514 where this path emerges from the control pulse gate 391, and thence to phase inverter 380. A third resistor 633 is connected between the output side of the capacitor 632 and ground.

Assuming that a 1 stands in the carry flip-flop 355, and that consequently the gate tube 601 is conductive, a control pulse 382 introduced into the cathode transformer 608 causes the cathode 605 to become sufficiently more positive to cut off the tube, the transformer 608 being arranged for this purpose in the same fashion as the cathode transformer 534 of the check indicator 487. The cutting off of tube 601 causes the production of a positive pulse 635 at the anode 609, again as in the check indicator. As a result of the positive pulse 635, a secondary positive pulse 636 is produced in the secondary winding 628 and applied to the cathode 627 of the second diode 626. The secondary positive pulse 636 is of the same or slightly greater voltage magnitude than the check pulse 382 and maintains the second diode 626 nonconductive with respect to the control pulse 382, which arrives at the anode 625 thereof via the first resistor 619. The control pulse is, therefore, coupled via coupling capacitor 632 to the third resistor 633, and the voltage developed across the third resistor is provided to path 514 and the phase inverter 380.

If on the other hand a zero stands in the carry flip-flop 355, the voltage level of the control grid 602 of the gate tube 601 is such that the tube is nonconductive. The application of a control pulse 382 to the cathode 605 under this condition has no effect upon the state of the tube and positive pulses 635 and 636 are not produced. Therefore, when the control pulse 382 reaches the anode 625 of the second diode 626 via the first resistor 619, it passes through the diode and through the second resistor 631 to ground at 629. Thus, the first resistor 619, the second diode 626 and the second resistor 631 comprise a voltage divider. In similar fashion as in the case of the check indicator, the first resistor 619 may be about 5,600 ohms and the second resistor 631 about 300 ohms, while the diode, in a conductive state, has a resistance of about 100 ohms. The output capacitor 632 is connected to this voltage divider at a point which is 400 ohms from the ground end 629 thereof so that again only about four-sixtieths of the original peak voltage of the control pulse 382 appears across the third resistor 633, and, therefore, it may be said that the control pulse gate 391 is substantially closed to the control pulse 382, or that path 514 is closed.

The phase inverter 380 comprises a double triode type tube 640 of which the two cathodes 641 and 642 are connected together to ground via a resistor 643 which is shunted with a bypass capacitor 644. The two anodes 645 and 646 are connected together to a B+ terminal 647 via an anode resistor 648 and coupled via a coupling capacitor 649 to lines 395 and 485, which are shown more fully in Fig. 10. Path 514 is connected to a first control grid 651 of the phase inverter tube 640, while line 519 of path 515 is connected to the second control grid 652 thereof. The third resistor 633 of control pulse gate 391 has a value in the neighborhood of a megohm, which is substantially the same as the grid to cathode impedance of a triode section of the phase inverter tube 640. As far as the control pulse 382 is concerned, the cathodes 641 and 642 are at ground potential, the bypass capacitor 644 being of sufficient magnitude to pass the pulse around the cathode resistor 643. Therefore, when the control pulse gate 391 passes the control pulse 382 to the phase inverter 380, the conductivity of the tube 640 is substantially increased and a negative pulse 396 appears on the anodes 645 and 646 thereof. This negative pulse 396 is coupled via the coupling capacitor 649 to lines 395 and 485 and thence to the control flip-flop 350 and the carry flip-flop 355, respectively, as set forth above in connection with Fig. 10.

Control pulse gate 392 is arranged to be open to the passage of a control pulse 382 arriving via path 515 when the column 4 flip-flop 354 stands at 1. Gate 392 comprises a circuit similar in many respects to gate 391. There is again a pentode-type electron tube 655, a cathode transformer 656 and an anode circuit transformer 657 all arranged in similar fashion to the arrangement in control pulse gate 391. The line 511 from the column 4 output stage 435 is connected to the control grid 658 of the tube 655, and this grid is biased by way of a bias terminal 659 so that the tube is conductive when the column 4 flip-flop 354 stands at 1 and is cut off when the flip-flop stands at zero. Thus, as in the case of control pulse gate 391, when a control pulse 382 arrives in the cathode transformer 656, the cathode 661 is driven in a positive direction. If the column 4 flip-flop 354 stands at 1, the tube is conductive and the control pulse 382 passes through the gate 392 by way of resistor 662 and continues along the path 515 to the next control pulse gate 394. On the other hand, if the column 4 flip-flop 354 stands at zero, the control pulse 382 passes through resistor 662 and a diode 663, which functions in the same fashion as the second diode 626 of control pulse gate 391, to a second resistor 664 of substantially smaller magnitude than the first resistor 662, and thence to ground at 665. The arrangement of resistors 662 and 664 and the diode 663 is again a voltage divider with the output from the gate 392 to path 515 taken at the junction of the larger resistor 662 and the anode of the diode 663.

The positive control pulse 382 is then applied via a coupling capacitor 667 to an amplifier 668 which functions also as an isolating stage between gates 392 and 394. The amplifier 668 comprises an electron tube 669, the cathode 671 of which is grounded at 672, and connected through first and second resistors 673 and 674 and a suitable terminal 675 to a source of potential (not shown) which is negative with respect to ground. The control grid 676 is connected to the coupling capacitor 667 through which the control pulse 382 arrives from gate 392, and to the junction of resistors 673 and 674 via another resistor 677. By these connections the control grid is so biased that the tube is normally substantially cut off, and the arrival of a control pulse 382 renders the tube conductive so that a negative pulse 680 is produced at the anode 681. Anode potential is furnished via B+ line 410 and a connection 682 therefrom to the anode 681 through the primary winding 683 of an anode circuit transformer 684. A unidirectional conductor 685 is shunted across the primary winding 683 poled to conduct positive pulses from the anode to the B+ connection 682. The isolating amplifier 668 may be regarded as a part of either of gates 392 or 394, or for that matter as a part of neither. It, however, provides the negative pulse 680 to control pulse gate 394 in a fashion that will now be explained.

Control pulse gate 394 is arranged to pass the pulse 382' corresponding to the control pulse 382 to the phase inverter 380 when either one of the column 1, 2 or 3 flip-flops 351, 352 or 353, respectively, stands at 1. This gate includes again a pentode-type electron tube 690, the control grid 691 of which is connected to the source 590 of bias via a suitable bias connection terminal 692, and to the output stages of the column 1, 2 and 3 flip-flops via line 502 and unidirectional conductors 507, 508 and 509, respectively. One secondary winding 693 of the anode circuit transformer 684 of the amplifier 668 is connected at one end to the cathode 694 of gate tube 690 and at the other end to line 536, which connects to the cathode voltage tap 538 via line 537. A second secondary winding 696 of transformer 382 is connected at one end to ground at 697 and at the other end to a first resistor 698. The anode 699 of the gate tube 690 is provided with B+ potential via a line 701 which is connected to the B+ terminal 543. Line 701 is connected to the anode 699 through the primary winding 702 of an anode circuit transformer 703. A second primary winding 704 of this transformer is connected at one end to line 701 and at the other end to the screen grid 705 and provides screen voltage in similar fashion as in the other gates 391 and 392 and the check indicator 487. A unidirectional conductor 695 is connected in shunt with the first primary winding 702, and poled to conduct negative pulses from the anode 699 to line 701. A diode 706 is connected at its anode 707 to the first resistor 698 and at its cathode 708 to one end of the secondary winding 709 of the anode circuit transformer 703. The other end of secondary winding 709 is grounded at 711, and a second resistor 712 is connected across this secondary winding. The first resistor 698, the diode 706, and the second resistor 712 again provide a voltage divider of the kind wherein the first resistor has a resistance magnitude of about 5,600 ohms and the second resistor has a resistance magnitude of about 300 ohms. The junction of the first resistor 698 and the anode 707 of the diode 706 is connected to the second grid 652 of the phase inverter 380 via a coupling capacitor 713, and a third resistor 714 is connected from this second grid 652 to ground.

The two secondary windings 693 and 696 of the amplifier anode circuit transformer 684 are so arranged that the first winding 693 provides a first positive pulse 716 and the second winding 696 provides a second positive pulse 382' in response to the occurrence of a negative pulse 680 in the primary winding 683. The first and second positive pulses 716 and 382', respectively, are inverted in phase with respect to the primary pulse 680, and are accordingly again positive like the control pulse 382. The first positive pulse 716 drives the cathode 694 of the gate tube 690 in the positive direction and again the operation is the same as in the prior described gates. The second pulse 382' now takes the place of the control pulse 382 and is provided to the voltage divider comprising first and second resistors 698 and 712, and the diode 706. If either one of the columns 1, 2 or 3 flip-flops 351, 352 or 353 stands at 1, the gate tube 690 is cut off by the first pulse 716, a positive pulse 717 is generated in the secondary winding 709 of the anode circuit transformer to cut off the diode 706, and the new control pulse 382' passes through the coupling capacitor 713 and to ground through resistor 714. Again, as in the case of resistor 633 of gate 391, resistor 714 is large, about a megohm, and pulse 382' appears between the second grid 652 and cathode 641 of the tube 640 of the phase inverter 380 to provide the negative pulse 396. If on the other hand all three of the first, second and third column flip-flops stands at zero, the diode 706 of gate 394 is not cut off with respect to the second positive pulse 382' and the new control pulse 382' passes therethrough to ground at 711 via the smaller resistor 712 and substantially no control pulse voltage is provided across the output resistor 714. Thus, both gates 392 and 394 must be open to the passage of control pulse 382 to provide the negative pulse 396 to the control and carry flip-flops 350 and 355, respectively.

Figures 16, 17:
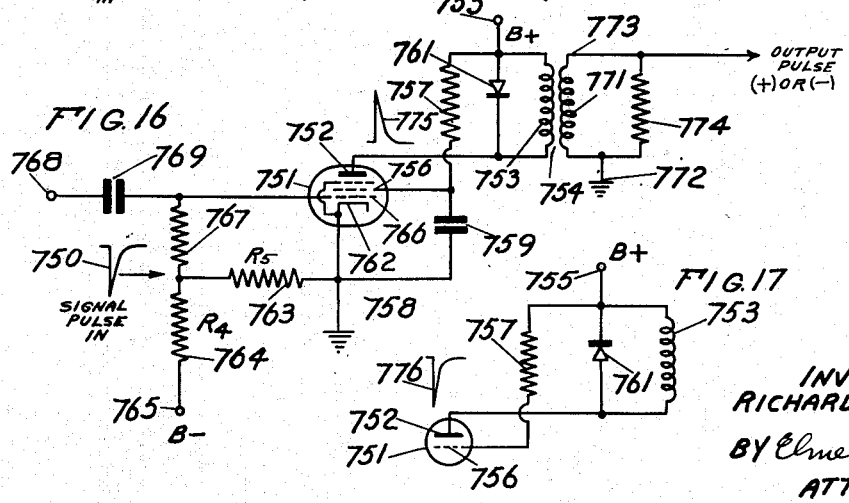
Figs. 16 and 17 are circuit diagrams illustrating two forms of a phase inverter which may be employed in carrying out the invention.

Referring now to Fig. 16, a phase inverter is shown which accepts a negative pulse 750 and produces a positive or negative output pulse in response thereto by transformer action. An electron tube 751 is connected at its anode 752 to a source of anode potential B+ (not shown) via the primary winding 753 of an anode circuit transformer 754 and a suitable terminal 755. The screen grid 756 of the tube is connected to terminal 755 via a resistor 757 and to ground at 758 via a capacitor 759. A unidirectional conductor 761 is connected in shunt with the primary winding 753, and poled to pass negative pulses from the anode 752 to terminal 755. The cathode 762 of the tube is connected to ground at 758 and through a first resistor 763 and a second resistor 764 in series to a source of negative potential B— (not shown) via a suitable terminal 765. The control grid 766 is connected to the junction of the first and second resistors 763 and 764, respectively, via a third resistor 767. The input pulse 750 is brought to the control grid via an input terminal 768 through a coupling capacitor 769. The secondary winding 771 of the anode circuit transformer 754 is grounded at one end at 772 and provides output pulses at the other end 773 thereof. A resistor 774 is connected in shunt with the secondary winding 771.

The tube 751 is maintained normally conductive by the choice of B+ and B— potentials and the values of resistors 763 and 764. The value $R_4$ of resistor 764 may, for example, be 150,000 ohms, and value $R_5$ of resistor 763 may be 6,200 ohms. With suitably chosen potentials, the potential at the control grid 766 is thereby adjusted so that the tube is normally conductive, and the introduction of the negative signal pulse 750 renders the tube non-conductive to produce a positive pulse 775 at the anode 752. The secondary winding 771 is connected so that at the output side 773 thereof a positive or negative pulse is available as desired.

Fig. 17 illustrates modification of Fig. 16 in order that the circuit of Fig. 16 may accept positive signal pulses. In this case, $R_3$, the value of resistor 763, is made relatively larger, for example, about 10,000 ohms, so that the tube 751 is normally nonconductive. The introduction of a positive signal pulse then causes the production of a negative pulse 776 at the anode 752. The unidirectional conductor 761 is accordingly reversed so that it now passes positive changes in potential from the anode 752 to the B+ terminal 755. In other respects, the circuit of Fig. 17 is identical to the circuit of Fig. 16. It will be appreciated that the circuit of Fig. 17 is suitable for use in phase inverter 522 of Fig. 10.

It will be appreciated that the invention may take many forms too numerous to set forth herein, and may be employed in numberless situations. Thus, for example, in a computing machine, the invention has been employed not only to monitor or supervise storage and transfers throughout the machine, but also to verify the selection of memory positions and the transfers of operation codes. The memory system of a computer may involve some hundreds of delay lines in each of which there may be stored, for example, thirty-two information words. Thus, a selection from the memory involves a spatial selection from among the information delay lines and a temporal selection from among the information word positions in the delay line selected. The delay lines each have associated therewith an identifying word or "tag" which is a binary number. Whenever a line is selected, the identifying word thereof is compared for identity with the number of the line as it occurs in the command governing the selection. The circuit of Fig. 7 is useful for this purpose. The temporal selection is made with the aid of an auxiliary delay line, which is operated in synchronism with the information delay lines. The various word positions in the auxiliary line contain binary numbers starting with 0. Each time a word is taken from an information line, a word is simultaneously gated out of the auxiliary delay line, and the number so obtained is compared for identity with the information word position as it appears in the command governing the selection. Again, the circuits and systems already described in detail have readily apparent utility for this purpose. In this manner, each selection made from memory is verified during the selection cycle in which it occurs.

The utility of the invention in supervising telemetering systems makes possible also, for example, supervision of the transmission of operational codes from the central control of a computer to the arithmetic unit thereof. To this end, a code generator is incorporated in the arithmetic unit. For each arithmetic operation the code generator returns an operation code to central control for comparison purposes.

Although from the foregoing description of the invention as applied to a computer it might appear that the supervising system is elaborate in the sense that each function of the computer is checked during each operating cycle, the equipment necessary to provide such checking actually does not exceed twenty per cent of the total equipment in the computer. The supervising equipment may conveniently have associated with it a set of controls and indicator lights, for example neon lights, which operate to stop the computing machine and indicate the location of the fault. By virtue of such diagnostic characteristics, the defective part of subassembly can be quickly located and replaced, in many cases without loss of information or the disruption of the computing routine.

The invention is, of course, not to be limited to or by details of the specific elements employed in the various embodiments thereof that have been herein illustrated and described. For example, the term "delay line" is understood to be merely illustrative of any suitable means for creating a suitable time differential or delay. Likewise, as has been pointed out, the terms "unidirectional conductor," "rectifying device," and "rectifier" are all generally representative of a suitable device such as a crystal or a diode or the like for isolating, clamping, or other purposes as set forth.

It will be apparent to those skilled in the art that the invention may occur in still other forms and employments, and accordingly it is intended that the claims that follow shall be limited not by the details of the embodiments described herein, but rather only by the prior art.

In the claims that follow, the term "compare" is employed to mean any checking of an arrived-at result, quantity, indicator, or number against a standard, whether arbitrarily established or systematically arrived at, for the purpose of determining whether or not a particular relationship exists.

What is claimed is:

1. A system for handling an item of information in the binary notation comprising means for assigning arbitrary numerical values to the columns of the binary representation of said item differing among each other and from the normal values of said columns in accordance with a prescribed scheme, means for deriving a first binary number in accordance with the sum of the assigned numerical values of those columns wherein the digit "1" appears, means for performing an operation upon said representation which operation terminates in a resulting binary representation, means for assigning numerical values to the columns of said resulting binary representation differing among each other and from the normal values of said columns in accordance with a prescribed scheme, means for deriving a second binary number in accordance with the sum of the assigned numerical values of those columns of said resulting binary representation wherein the digit "1" appears, and means for comparing said sums.

2. A system for supervising the transfer of an item of information in the binary notation together with an indicator derived by generating a first binary number signal in accordance with the binary system representation of said item, comprising means for translating said binary number signal and said representation, means to receive said number signal and said representation, means for generating a second binary number signal in accordance with said representation as translated, and means for comparing said first and second binary number signals.

3. A system for supervising the mathematical addition of two binary quantities comprising means for generating from each quantity and their sum of a weighted count of the 1-bearing columns in accordance with a prescribed column weighting scheme, means for summing the weighted counts of said quantities, and means to compare the weighted counts of the sum of said quantities with the sum of the weighted counts of said quantities.

4. A system for supervising the algebraic addition of two binary quantities comprising means for weighting corresponding columns of each quantity and their sum with similar values chosen in accordance with the scheme 1, 2, 4, 8, 16, 1, 2, 4, 8, 16, etc., starting with the extreme right-hand column, means for generating a weighted count of the 1-bearing columns of each of said quantities and their sum, means for summing the weighted counts of said quantities, means for deriving the difference between the weighted count of the sum of said quantities and the sum of the weighted counts of said quantities, means for providing binary 31, means for adding binary 31 to the absolute value of said difference, means for weighting the columns of the binary form of the resulting sum in accordance with said scheme, means for generating a fourth weighted count of the 1-bearing columns of said resulting sum, and means for comparing said fourth weighted count with binary 31.

5. A system for supervising the multiplication of two binary quantities comprising means for generating from each quantity and their product a weighted count in accordance with a prescribed scheme, means for multiplying the weighted counts of said quantities, means for generating from the resulting product a fourth weighted count in accordance with said scheme, and means for comparing said fourth weighted count with the weighted count of the product of said quantities.

6. A system for supervising the multiplication of two binary quantities comprising means for weighting corresponding columns of each quantity and their product with similar values chosen in accordance with the scheme 1, 2, 4, 8, 16, 1, 2, 4, 8, 16, etc., starting with the extreme right-hand column, means for generating a weighted count of the 1-bearing columns of each of said quantities and their product, means for multiplying the weighted counts of said quantities, means for generating from the resulting product a fourth weighted count of the 1-bearing columns in accordance with said scheme, means for deriving the difference between said fourth weighted count and the weighted count of the product of said quantities, means for providing binary 31, means for adding binary 31 to the absolute value of said difference, means for weighting the columns of the binary form of the resulting sum in accordance with said scheme, means for generating a fifth weighted count of the 1-bearing columns of said resulting sum, and means for comparing said fifth weighted count with binary 31.

7. A system for supervising the division of two binary quantities comprising means for generating from each quantity, their quotient and remainder a weighted count in accordance with a prescribed scheme, means for multiplying the weighted counts of the divisor and the quotient, means for generating from the resulting product a fifth weighted count in accordance with said scheme, and means for comparing the sum of the weighted count of the remainder and said fifth weighted count with the weighted count of the numerator.

8. A system for supervising the division of two binary quantities comprising means for weighting corresponding columns of each quantity, their quotient and remainder with similar values chosen in accordance with the scheme 1, 2, 4, 8, 16, 1, 2, 4, 8, 16, etc., starting with the extreme right-hand column, means for generating a weighted count of the 1-bearing columns of each of said quantities, their quotient and remainder, means for multiplying the weighted counts of the divisor and the quotient, means for generating from the resulting product a fifth weighted count in accordance with said scheme, means for deriving the sum of the weighted count of the remainder and said fifth weighted count, means for deriving the difference between said sum and the weighted count of the numerator, means for providing binary 31, means for adding binary 31 to the absolute value of said difference, means for weighting the columns of the binary form of the last resulting sum in accordance with said scheme, means for generating a sixth weighted count of the 1-bearing columns of said last resulting sum, and means for comparing said sixth weighted count with binary 31.

9. A system for supervising the conversion of numerical information between the binary and decimal notations comprising means for weighting the columns of the binary form of said information in accordance with a first prescribed scheme, means for generating a weighted count of said binary form as weighted, means for deriving the algebraic sum of the digits of the decimal form of said information, means for deriving a weighted count of the remainder after conversion in accordance with a second prescribed scheme, related to said first scheme, and means to derive the sum of said algebraic sum and said weighted counts.

10. A system for supervising the conversion of numerical information between the binary and decimal notations comprising means for weighting the columns of the binary form of said information in accordance with a first prescribed scheme, means for generating a weighted count of said binary form as weighted, means for deriving the algebraic sum of the digits of the decimal form of said information, means for deriving a weighted count of the remainder after conversion in accordance with a second prescribed scheme related to said first scheme, and means to derive the sum of said algebraic sum and said weighted counts, said last-named means including an electronic gate circuit and control means therefor, said circuit having a check signal input path and first and second output paths, said control means being connected to cause a check signal to take said first path when the derived sum has a first prescribed value with a prescribed modulo and to take said second path when said derived sum has any other value with the same modulo.

11. A system for supervising the conversion of an item of fractional numerical information from the binary to the decimal notation where in each notation the number consists of digits following the binary or decimal point to the right, comprising means for weighting the columns of the binary form of said information in accordance with the scheme 4, 2, 1, 5, 7, 8, 4, 2, 1, 5, 7, 8, etc., from the binary point to the right, means for weighting the binary columns of the remainder after conversion in accordance with the scheme 5, 7, 8, 4, 2, 1, 5, 7, 8, 4, 2, 1, etc., from the binary point to the right, and means for summing modulo 9 the 1-bearing weighted columns of said binary form of said information, said remainder, and the algebraic values of the digits of the decimal form of said information.

12. A system for supervising the conversion of an item of fractional numerical information from the decimal to the binary notation where in each notation the number consists of digits following the binary or decimal point to the right, comprising means for weighting the columns of the binary form of said information in accordance with the scheme 4, 2, 1, 5, 7, 8, 4, 2, 1, 5, 7, 8, etc., from the binary point to the right, means for weighting the columns of the binary-coded form of each digit of the remainder after conversion in accordance with the same scheme commencing with the weight 4, 2, 1, 5, 7, or 8 depending upon the number of columns attained in said binary form of said information in accordance with the relation $$n = 6p + k$$

where:

$n$ is said number of columns, $p$ is a non-negative integer, and $k$ is an integer which can have a value from 0 to 5, inclusive, and means for summing modulo 9 the 1-bearing weighted columns of said binary form of said information and of said binary-coded form of said digits of said remainder, and the algebraic values of the decimal form of said information.

13. A system for supervising the conversion of numerical information between the binary and decimal notations where in each notation the number consists of digits following the binary or decimal point to the right, comprising means for weighting the columns of the binary form of said information in accordance with the scheme 4, 2, 1, 5, 7, 8, 4, 2, 1, 5, 7, 8, etc., means for weighting the columns of the binary form of the remainder after conversion in accordance with the same scheme, and means for summing modulo 9 the 1-bearing weighted columns of said binary form of said information and remainder and the algebraic values of the decimal form of said information.

14. In an information handling system, means providing a first group of information signal elements which are arranged with respect to each other in accordance with a first scheme whereby to convey intelligence, means for generating a second group of information signal elements from said first group in accordance with a second scheme wherein said first group elements are given relative values different from their relative values in accordance with said first scheme and differing among each other, means for performing an operation upon said first group, and means responsive to said second group and to a reference group of signal elements for monitoring said operation.

15. In an information handling system, means providing a first group of information signal elements which are arranged with respect to each other in accordance with a first scheme whereby to convey intelligence, means for generating a second group of information signal elements from said first group in accordance with a scheme wherein said first group elements are given relative values different from their relative values in accordance with said first scheme and differing among each other, means for performing an operation upon said first group and thereby providing a resulting group of information elements conforming to said first scheme, means for generating a third group of information signal elements from said resulting group in accordance with a scheme wherein said resulting group elements are given relative values different from their relative values in accordance with said first scheme and differing among each other, and means for comparing said second and third groups.

16. A system for handling information in the form of a first series of numerical information signal elements comprising means for assigning to successive ones of said elements arbitrary numerical values of a second cyclically repeating series different from the normal values of said elements, means for deriving a second series of information signal elements indicative of a sum of said arbitrary numerical values in accordance with the composition of said first series, and means responsive to said second series and to a reference signal element series for monitoring the handling of said information.

17. In an information handling system, electrical means providing a first series of electric pulses which are arranged with respect to each other in accordance with a first scheme whereby to convey intelligence, a plurality of signal paths, electrical switch means arranged to direct successive ones of said pulses into successive ones of said paths in accordance with a second scheme, electrical means to derive from the electric pulses thereby present in said paths a second series of electric pulses in accordance with the composition of said first series, and means employing said second series of electric pulses and a reference series of electric pulses to monitor the handling of said first series.

18. In an information handling system, electrical means providing a first series of electric pulses which are arranged with respect to each other in accordance with a first scheme whereby to convey intelligence, a plurality of signal paths fewer in number than the total possible number of electric pulses in said series, electrical switch means between said electrical means and said pulse paths arranged to direct successive ones of said pulses into successive ones of said paths in accordance with a cyclically repeated switching scheme, electrical means to derive from the electric pulses thereby present in said paths a second series of electric pulses in accordance with the composition of said first series, and means employing said second series of electric pulses and a reference series of electric pulses to monitor the handling of said first series.

19. In an information handling system, electrical means providing a first chronological series of electric pulses which are arranged with respect to each other in accordance with a first scheme whereby to convey intelligence in the binary form of notation, said intelligence residing in the presence or absence of a pulse in each of a first plurality of successive pulse spaces, a second plurality of pulse paths fewer in number than said first plurality, normally closed switch means between said electrical means and said paths arranged cyclically and successively to open selected ones of said paths momentarily during successive ones of said pulse spaces, and a binary counter having said paths as the inputs to successive columns thereof.

20. In an information handling system, electrical means providing a first chronological series of electric pulses which are arranged with respect to each other in accordance with a first scheme whereby to convey intelligence in the binary form of notation, said intelligence residing in the presence or absence of a pulse in each of a first plurality of successive pulse spaces, a second plurality of pulse paths fewer in number than said first plurality, normally closed switch means interposed between said electrical means and said paths arranged cyclically and successively to open selected ones of said paths momentarily during successive ones of said pulse spaces, a binary counter having one column in excess of said second plurality, means connecting said paths in input relation to successive columns of said counter except said one column, said one column being the highest order column and said counter having no carry following said one column.

21. A system for handling an item of information in the binary notation comprising means for assigning arbitrary numerical values to the columns of the binary representation of said item differing among each other and from the normal values of said columns in accordance with a prescribed scheme, means for deriving a first binary number representing the sum to a prescribed modulus of the assigned numerical values of those columns wherein the digit 1 appears, means for performing an operation upon said representation which operation terminates in a resulting binary representation, means for assigning numerical values to the columns of said resulting binary representation differing among each other and from the normal values of said columns in accordance with a prescribed scheme, means for deriving a second binary number representing the sum to said modulus of the assigned numerical values of those columns of said resulting binary representation wherein the digit 1 appears, and means for comparing each column of said first binary number with the corresponding column of said second binary number.

22. A system for supervising the transfer of an item of information in the binary notation together with an indicator derived by assigning arbitrary numerical values to the columns of the binary representation of said item differing from the normal values of said columns in accordance with a prescribed scheme, and deriving a first binary number representative of the sum to a prescribed modulus of the assigned numerical values of those columns wherein the digit 1 appears, comprising means for translating said binary representation and said first binary number as a single binary-form unit, means to receive said unit as translated and to separate said representation from said first binary number, means for assigning arbitrary numerical values to the columns of said representation as received differing from the normal values of said columns in accordance with said scheme, means for deriving a second binary number representative of the sum to said modulus of the assigned numerical values of those columns of said received representation wherein the digit 1 appears, and means for comparing each column of the first binary number with the corresponding column of the second binary number.

23. A system for supervising a mathematical operation being performed upon first and second binary numbers comprising means for generating from each number and the result of said operation a weighted count of the 1-bearing columns in accordance with a prescribed column weighting scheme wherein values differing from the normal values are assigned to the columns, means for performing upon the weighted counts of said numbers a second mathematical operation which is related to the operation performed upon said numbers, and means to compare the weighted count of said result with the result of said second operation.

24. A system for supervising the mathematical addition of two binary quantities comprising means for generating from each quantity and their sum a weighted count of the 1-bearing columns in accordance with a column weighting scheme wherein the columns of each quantity and the sum are assigned values differing from the normal values and regularly changing from one end to the other, means for summing the weighted counts of said quantities, and means to compare the weighted counts of the sum of said quantities with the sum of the weighted counts of said quantities.

25. A system for supervising the mathematical addition of two binary quantities comprising means for generating from each quantity and their sum a weighted count in accordance with a prescribed column weighting scheme, means for summing the weighted counts of said quantities, means for deriving the difference between the weighted count of the sum of said quantities and the sum of the weighted counts of said quantities, means for providing a predetermined binary quantity, means for adding said predetermined quantity to the absolute value of said difference, means for generating a fourth weighted count of the resulting sum in accordance with said scheme, and means for comparing said fourth weighted count with said predetermined quantity.

26. A system for supervising the algebraic addition of two binary quantities comprising means for weighting corresponding columns of each quantity and their sum with similar values chosen in accordance with the scheme 1, 2, 4, 8, 16, 1, 2, 4, 8, 16, etc., starting with the extreme right-hand column, means for generating a weighted count of the 1-bearing columns of each of said quantities and their sum, means for summing the weighted counts of said quantities, and means for comparing the weighted count of the sum of said quantities with the sum of the weighted counts of said quantities.

27. A system for supervising the multiplication of two binary quantities comprising means for generating from each quantity and their product a weighted count in accordance with a prescribed scheme, means for multiplying the weighted counts of said quantities, means for generating from the resulting product a fourth weighted count in accordance with said scheme, means for deriving the difference between said fourth weighted count and the weighted count of the product of said quantities, means for providing a predetermined binary quantity, and means for comparing said difference with said predetermined quantity.

28. A system for supervising the multiplication of two binary quantities comprising means for generating from each quantity and their product a weighted count in accordance with a prescribed scheme, means for multiplying the weighted counts of said quantities, means for generating from the resulting product a fourth weighted count in accordance with said scheme, means for deriving the difference between said fourth weighted count and the weighted count of the product of said quantities, means for providing a predetermined binary quantity, means for adding said predetermined quantity to the absolute value of said difference, means for generating a fifth weighted count of the resulting sum in accordance with said scheme, and means for comparing said fifth weighted count with said predetermined quantity.

29. A system for supervising the multiplication of two binary quantities comprising means for weighted corresponding columns of each quantity and their product with similar values chosen in accordance with the scheme 1, 2, 4, 8, 16, 1, 2, 4, 8, 16, etc., starting with the extreme right-hand column, means for generating a weighted count of the 1-bearing columns of each of said quantities and their product, means for multiplying the weighted counts of said quantities, means for generating from the resulting product a fourth weighted count in accordance with said scheme, and means for comparing said fourth weighted count with the weighted count of the product of said quantities.

30. A system for supervising the division of two binary quantities comprising means for generating from each quantity, their quotient and remainder a weighted count in accordance with a prescribed scheme, means for multiplying the weighted count of the divisor and the quotient, means for generating from the resulting product a fifth weighted count in accordance with said scheme, means for deriving the sum of the weighted count of the remainder and said fifth weighted count, means for deriving the difference between said sum and the weighted count of the numerator, means for providing a predetermined binary quantity, and means for comparing said difference with said predetermined quantity.

31. A system for supervising the division of two binary quantities comprising means for weighting corresponding columns of each quantity, their quotient and remainder with similar values chosen in accordance with the scheme 1, 2, 4, 8, 16, 1, 2, 4, 8, 16 etc., starting with the extreme right-hand column, means for generating a weighted count of the 1-bearing columns of each of said quantities, their quotient and remainder, means for multiplying the weighted counts of the divisor and the quotient, means for generating from the resulting product a fifth weighted count in accordance with said scheme, means for deriving the sum of the weighted count of the remainder and said fifth weighted count, means for deriving the difference between said sum and the weighted count of the numerator, means for providing binary 31, and means for comparing said difference with binary 31.

32. A system for supervising the conversion of an item of numerical information from the binary to the decimal notation comprising means for weighting the columns of the binary form of said information in accordance with a first prescribed scheme, means for generating a weighted count of said binary form as weighted, means for deriving the algebraic sum of the digits of the decimal form of said information, means for weighting the columns of the binary form of the remainder after conversion in accordance with a second prescribed scheme related to said first scheme, means for generating a weighted count of said remainder as weighted, and means to derive the sum of said algebraic sum and said weighted counts.

33. In a system which handles information in numerical form, supervising means comprising means to generate a numerical indicator by algebraic summation of the elements of said information, means to alter said indicator by a fixed amount, and means responsive to said indicator as thus altered and to a reference indicator to supervise the handling of said information.

34. A system for handling an item of information in the binary notation comprising means for weighting the columns of the binary form of said item in accordance with the scheme 1, 2, 4, 1, 2, 4, 1, 2, 4, etc., starting with the extreme right-hand column, and means for deriving a binary sum of the 1-bearing columns of said item as thus weighted.

35. A system for handling an item of information in the binary notation comprising means for weighting the columns of the binary form of said item in accordance with the scheme 1, 2, 4, 1, 2, 4, 1, 2, 4, etc., starting with the extreme right-hand column, means for deriving a binary sum of the 1-bearing columns of said item as thus weighted, and means to increase said binary sum by 1.

36. A system for handling an item of information in the binary notation together with an indicator derived by weighting the columns of the binary form of said item in accordance with the scheme 1, 2, 4, 1, 2, 4, 1, 2, 4, etc., starting with the extreme right-hand column, and deriving a binary sum of the 1-bearing columns of said item as thus weighted, comprising means to translate said item and said indicator as a single group of binary elements, means to receive said group and to separate said item from said indicator, means to weight the columns of the binary form of said item as received in accordance with said scheme, means for deriving a second binary sum of the 1-bearing columns of said received item as thus weighted, and means to compare the received binary sum with said second indicator.

37. A system for handling information in the form of a group of information signal elements consisting of a sequence of elements each of which is in one or the other of two mutually exclusive states, comprising means to provide said sequence of elements, means for assigning to each element space in said sequence a predetermined value according to a scheme wherein said predetermined values differ among each other in a regularly-repeated fashion, means for generating a signal which is characteristic of said group by operation upon said predetermined values in accordance with a prescribed scheme, and means responsive to the composition of said signal and a reference signal for monitoring the handling of said information.

38. A system for handling information in the form of a group of information signal elements consisting of a sequence of elements each of which is in one or the other of two mutually exclusive states, comprising means to provide said sequence of elements, means for assigning to each element space in said sequence a predetermined value according to a scheme wherein said predetermined values differ among each other in a regularly-repeated cycle, means for generating a signal which is characteristic of said group by operation upon said predetermined values in accordance with a prescribed scheme related to said cycle, means for performing an operation upon said group, and means responsive to the composition of said signal and a reference signal for monitoring the accuracy of said operation.

39. A system for supervising a mathematical operation being performed upon first and second numerical information items wherein each item and the result of said operation are in the form of a distinct group of information signal elements and each group consists of a sequence of elements each of which is in one or the other of two mutually exclusive states, said system comprising means to provide each of said sequences of elements, means for assigning to each element space in each sequence a predetermined value according to a scheme wherein said predetermined values differ among each other in a regularly-repeated fashion, means for generating from each sequence a secondary group of information signal elements by operation upon said predetermined values of said sequence in accordance with a prescribed scheme, means for performing upon the secondary groups of information elements of said items a second mathematical operation related to the operation being supervised, and means for comparing the result of said second operation with the secondary group of information elements of said result of said operation being supervised.

40. A system for handling an item of information in the binary notation comprising means for weighting the columns of the binary form of said information in accordance with a prescribed scheme, means for generating a binary-form number by summation of the 1-bearing columns as thus weighted, means for increasing said number by one binary digit, and means employing said increased binary number and a reference binary member to monitor the handling of said information.

41. A system for handling information in the form of a group of information signal elements consisting of a sequence of elements each of which is in one or the other of two mutually exclusive states, comprising means to provide said sequence of elements, means for assigning a predetermined value to each element space in said sequence, means for generating a signal which is characteristic of said group by operation upon the predetermined values of those element spaces which bear information in only one of said two states, and means responsive to the composition of said signal and a reference signal for monitoring the handling of said information.

RICHARD M. BLOCH.

REFERENCES CITED

The following references are of record in the file of this patent:

UNITED STATES PATENTS

| Number | Name | Date |
| --- | --- | --- |
| 2,241,591 | Gates | May 13, 1941 |
| 2,388,354 | Wheeler | Nov. 6, 1945 |
| 2,425,549 | Luhn | Aug. 12, 1947 |